US012705808B2

(12) United States Patent
Singh et al.

(10) Patent No.: US 12,705,808 B2
(45) Date of Patent: Aug. 11, 2026

(54) AI-BASED VISUAL CONTENT COLLAGE GENERATION

(71) Applicant: Microsoft Technology Licensing, LLC, Redmond, WA (US)

(72) Inventors: Aryan Singh, Noida (IN); Gaurav Vinayak Tendolkar, Reston, VA (US); Sumithra Bhakthavatsalam, Kirkland, WA (US); Prashant Gupta, Auraiya (IN); Mayura Vijayendra Bisineer, Cupertino, CA (US); Akshiv Baluja, Delhi (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 18/581,559

(22) Filed: Feb. 20, 2024

(65) Prior Publication Data

US 2025/0265751 A1 Aug. 21, 2025

(51) Int. Cl.
*G09G 5/00* (2006.01)
*G06F 40/40* (2020.01)
(Continued)

(52) U.S. Cl.
CPC .............. *G06T 11/60* (2013.01); *G06F 40/40* (2020.01); *G06T 5/30* (2013.01)

(58) Field of Classification Search
CPC ................. G09G 5/14; G09G 2340/10; G09G 2340/125; G06T 11/60; G06T 15/503;
(Continued)

(56) References Cited

U.S. PATENT DOCUMENTS

2005/0044485 A1 2/2005 Mondry et al.
2014/0086508 A1 3/2014 Tang et al.
(Continued)

OTHER PUBLICATIONS

International Search Report and Written Opinion received for PCT Application No. PCT/US2025/011332, Apr. 25, 2025, 15 pages.
(Continued)

*Primary Examiner* — Gordon G Liu
(74) *Attorney, Agent, or Firm* — NovoTechIP International PLLC

(57) ABSTRACT

A data processing system implements receiving, via a user interface of a client device, images for generating a collage image; generating captions for the images; constructing a first prompt by appending the captions to a first instruction string including instructions to a generative language model to extract a theme from the captions; providing the first prompt to the generative language model and receiving the theme therefrom; constructing a second prompt by appending the theme to a second instruction string including instructions to a text-to-image model to use the theme to create a background image with placeholders; providing the second prompt to the text-to-image model and receiving the background image therefrom; identifying the placeholders in the background image; creating the collage image by fitting the images into the identified placeholders; providing the collage image to the client device; and causing the user interface to display the collage image.

20 Claims, 14 Drawing Sheets

(51) Int. Cl.
*G06T 5/30* (2006.01)
*G06T 11/60* (2006.01)

(58) Field of Classification Search
CPC . G06T 2207/30196; G06T 2207/10016; G06T 7/13; G06T 7/50; G06T 2200/24; G06T 2207/10024; G06T 2207/20221; G06T 11/203; G06T 11/00; G06T 1/60; G06T 7/248; G06T 7/74; G06T 5/50; G06T 7/12; G06T 5/30; G06F 3/017; G06F 40/20; G06F 40/40; G06V 20/56; G06V 30/1423; G06V 10/764; G06V 10/56; H04N 23/69; H04N 23/60; H04N 21/8545; H04N 5/272; G02B 27/001; G02B 2027/0138; G02B 2027/014; B25J 9/1689; B25J 9/1697
USPC .......................................................... 345/629
See application file for complete search history.

(56) References Cited

U.S. PATENT DOCUMENTS

| | | | |
|---|---|---|---|
| 2014/0365887 | A1 | 12/2014 | Cameron |
| 2015/0086116 | A1 | 3/2015 | Yamaji |
| 2015/0178786 | A1* | 6/2015 | Claessens .......... G06Q 30/0277 705/14.66 |
| 2017/0289405 | A1* | 10/2017 | Agrawal ................... G06T 5/90 |
| 2020/0226179 | A1 | 7/2020 | Novikoff |
| 2022/0394001 | A1 | 12/2022 | Cundall et al. |
| 2024/0295953 | A1* | 9/2024 | Zakharov ............... G06V 10/82 |
| 2024/0320444 | A1* | 9/2024 | Maschmeyer ...... G06F 3/04845 |
| 2025/0095221 | A1* | 3/2025 | Jain ......................... G06T 11/00 |

OTHER PUBLICATIONS

Jia et al., "COLE: A Hierarchical Generation Framework for Multi-Layered and Editable Graphic Design", arXiv:2311.16974v2, Mar. 18, 2024, 20 pages.
Mirowski et al., "CLIP-CLOP: CLIP-Guided Collage and Photomontage", arXiv:2205.03146v3, Jul. 24, 2022, 5 Pages.
"Free AI Photo Collage Maker", Appy Pie Design, Jan. 18, 2022, 6 pages.
"Recognize theme in an image", Image Recognize, Jan. 24, 2024, 4 pages.

* cited by examiner

AI-BASED VISUAL CONTENT COLLAGE GENERATION

BACKGROUND

Artificial intelligence (AI) has the potential to automate our lives to save time and increase productivity. One area of interest is visual content creation, and image generative models have become popular and powerful tools for creating photo albums and collages. The existing AI-based collage generation platforms or applications analyze user-uploaded photos and generate different collage layout/style suggestions. However, it is up to the user to pick a template, drag and drop the photos into the template, and then adjust the collage to the user's liking. It is time-consuming for the user to select one among many collage templates, and then manually drag and drop the photos into the selected template, as well as tweak the collage image to get the final output. There are technical challenges to provide users with easier-to-use AI-based visual content collage creation. Hence, there is a need for more automated AI-based visual content collage creation systems and methods.

SUMMARY

An example data processing system according to the disclosure includes a processor and a machine-readable medium storing executable instructions. The instructions when executed cause the processor alone or in combination with other processors to perform operations including receiving, via a user interface of a client device, a plurality of images for generating a collage image; generating captions for one or more of the plurality of images; constructing, via a prompt construction unit, a first prompt by appending the captions to a first instruction string, the first instruction string including instructions to a generative language model to extract a theme from the captions; providing as an input the first prompt to the generative language model and receiving as an output the theme from the generative language model; constructing, via the prompt construction unit, a second prompt by appending the theme to a second instruction string, the second instruction string including instructions to a text-to-image model to use the theme to create a background image of the collage image with placeholders; providing as an input the second prompt to the text-to-image model and receiving as an output the background image from the text-to-image model; identifying, via an image placement unit, the placeholders in the background image; creating the collage image by fitting the plurality of images into the identified placeholders; providing the collage image to the client device; and causing the user interface of the client device to display the collage image.

An example method implemented in a data processing system includes receiving, via a user interface of a client device, a plurality of images for generating a collage image; generating captions for one or more of the plurality of images; constructing, via a prompt construction unit, a first prompt by appending the captions to a first instruction string, the first instruction string including instructions to a generative language model to extract a theme from the captions; providing as an input the first prompt to the generative language model and receiving as an output the theme from the generative language model; constructing, via the prompt construction unit, a second prompt by appending the theme to a second instruction string, the second instruction string including instructions to a text-to-image model to use the theme to create a background image of the collage image with placeholders; providing as an input the second prompt to the text-to-image model and receiving as an output the background image from the text-to-image model; identifying, via an image placement unit, the placeholders in the background image; creating the collage image by fitting the plurality of images into the identified placeholders; providing the collage image to the client device; and causing the user interface of the client device to display the collage image.

An example non-transitory computer readable medium data processing system according to the disclosure on which are stored instructions that, when executed, cause a programmable device to perform functions of receiving, via a user interface of a client device, a plurality of images for generating a collage image; generating captions for one or more of the plurality of images; constructing, via a prompt construction unit, a first prompt by appending the captions to a first instruction string, the first instruction string including instructions to a generative language model to extract a theme from the captions; providing as an input the first prompt to the generative language model and receiving as an output the theme from the generative language model; constructing, via the prompt construction unit, a second prompt by appending the theme to a second instruction string, the second instruction string including instructions to a text-to-image model to use the theme to create a background image of the collage image with placeholders; providing as an input the second prompt to the text-to-image model and receiving as an output the background image from the text-to-image model; identifying, via an image placement unit, the placeholders in the background image; creating the collage image by fitting the plurality of images into the identified placeholders; providing the collage image to the client device; and causing the user interface of the client device to display the collage image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
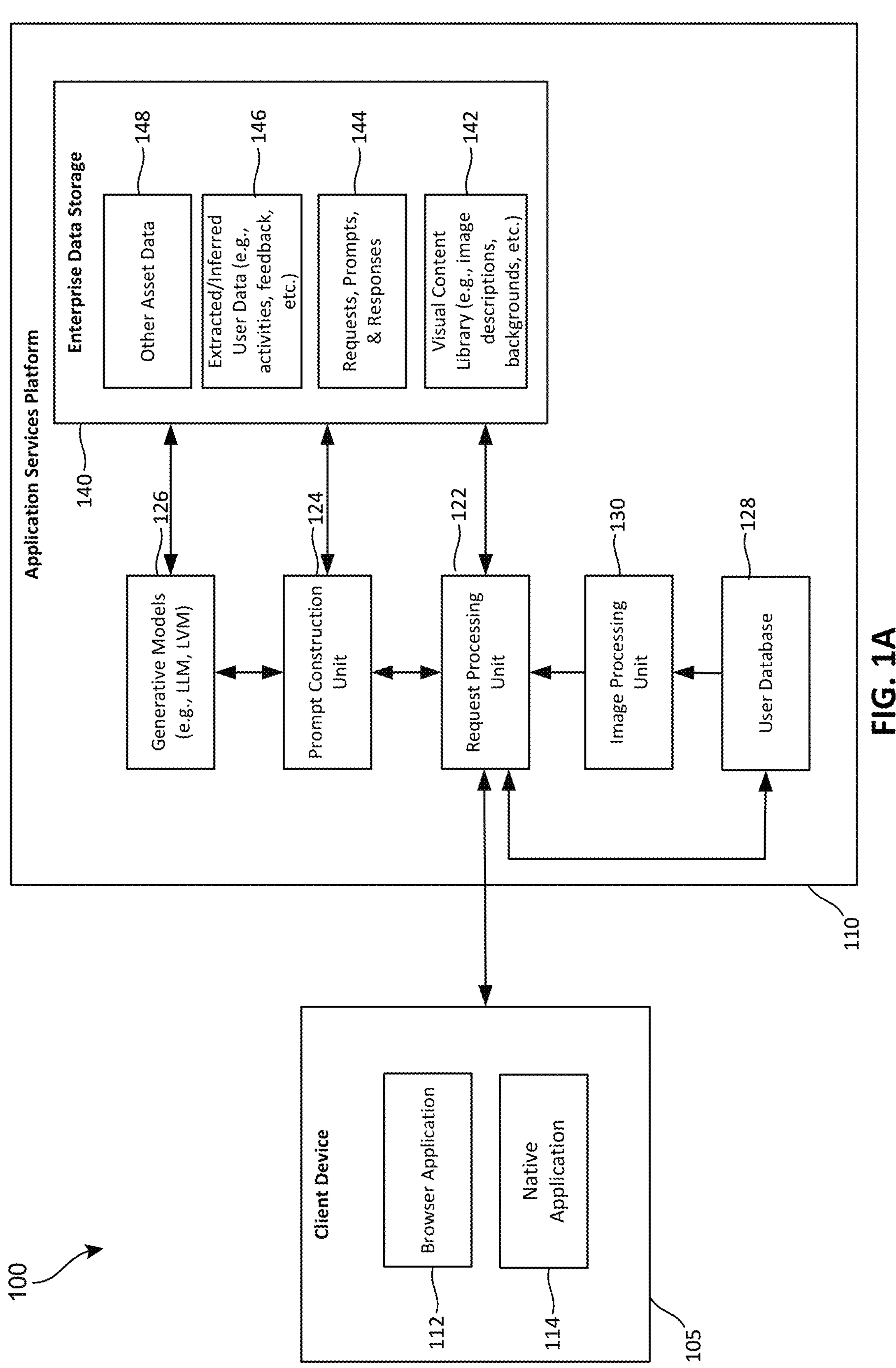
FIG. 1A is a diagram of an example computing environment in which the techniques for AI-based visual content collage generation are implemented.

Systems and methods for AI-based visual content collage generation are described herein. These techniques provide a technical solution to the technical problem of lack of easier-to-use AI-based visual content collage generation platforms/systems. A novel AI-based visual content collage generation pipeline improves efficiency and collage quality over the existing collage generation methods/systems by automatically generating a contextual theme based on image captions, using the theme to generate a background image, identifying placeholders in the background image, then placing the user-uploaded images into the placeholders. The existing AI-based photo collage generation systems automate some design tasks that were previously done manually, such as college template generation. Although these systems help users to work more efficiently and produce more photo collages, it takes a long time for a user to select one among many collage templates, and/or test different collage templates. The user then has to manually drag and drop the photos into the collage template, and/or move the photos around to get the final collage image.

To address these issues, the proposed technical solution improves visual content collage generation using generative model(s) by providing users with AI-based visual content collage generations based on a novel visual content collage generation pipeline to streamline the user experience by eliminating the need for selecting a collage template, or manually dragging and dropping the photos into the collage template, as well as by minimizing user editing of the collage. The pipeline enables users to create unique and artistic collages of their photos by simply uploading the photos. For example, the pipeline uses AI to generate a contextual background image based on a theme identified from the images, identifies placeholder(s) in the background images, and then places the user-uploaded images in the background image as the collage image of the photos. This pipeline works behind the scenes, and enhances the accessibility and efficiency of visual content collage creation. The pipeline uses a combination of deep learning, image processing, and post-processing techniques to generate/compose a collage. By applying generative model(s) on visual content (e.g., photos) collage generation, the pipeline can determine a theme from captions of the user-uploaded images, generate a background image based on the theme, and then automatically place the photos in the placeholders of the background image. As such, the user can easily generate desired visual content collage(s) with a background consistent with the user-uploaded images. As such, the pipeline provides an easy and creative way for users to express their ideas and enhance their photo collages, by just uploading images.

In one embodiment, the pipeline uses a combination of an image caption model, a large language model (LLM, e.g., GPT-turbo) and a large visual model (LVM, e.g., DALLE), which can be collectively a large multimodal model (LMM). In one embodiment, the pipeline generates a collage image based on a set of user-uploaded images and repeated prompts (e.g., applying different collage styles) to the generative model(s). For example, the pipeline uses the image caption model to generates captions for each image in the set, prompts the LLM to create a theme based on the captions, provides the theme to prompt the LVM to create a background image with empty slots, and creates the collage image by fitting the user-uploaded images into the slots.

A technical benefit of the approach provided herein is to perform visual content collage generation through generative models and other tools within a design platform with great user convenience by allowing users to upload images as a prompt, thereby alleviating the manual burden during the collage image creation process. By converting the images into captions, the pipeline generates a meta prompt infused with the captions, and extracts/infers a contextual theme of the user-uploaded images. Therefore, the generated collage image output more accurately represents the images. This not only improves the productivity of the user, but also decreases the computing resources required to refine the visual content collages based on the contextual theme.

Another technical benefit of the approach provided herein is to save time and effort by creating a variety of collages quickly based on user-uploaded images, and eliminating the need for manual collage template selection and dragging/dropping images into the collage template.

Yet, another technical benefit of this approach is to enhance creativity by applying AI to extract a theme based on image captions, thereby exploring unexpected artifact combinations in background images the user might not have considered.

Another technical benefit of the approach provided herein is providing an easy to use system that does not require design experience, to create beautiful collages with AI assistance.

An additional technical benefit of this approach is to provide automated visual content collage generation that offer more user choices than one simple collage, thereby improving the user experience. Moreover, the collage image(s) is presented to the user with high quality.

Another technical benefit of the approach provided herein is to support visual content collage generation not only for pure visual content collages but also for visual content collages with text, thereby increasing the diversity of collage image generation.

Yet, another technical benefit of the approach provided herein is to significantly improve the user experience in collage image creation within a design platform and in deployment as a new mini-application within the design platform.

Another technical benefit of this approach is storing the collage image output(s) as collage image template(s) in the visual content library thereby saving the user significant time and effort in creating similar visual content collages in the future. Yet another technical benefit of this is that other users can utilize the new visual content collage templates to save time and effort. These and other technical benefits of the techniques disclosed herein will be evident from the discussion of the example implementations that follow.

FIG. 1A is a diagram of an example computing environment 100 in which the techniques herein may be implemented. The example computing environment 100 includes a client device 105 and an application services platform 110. The application services platform 110 provides one or more cloud-based applications and/or provides services to support one or more web-enabled native applications on the client device 105. These applications may include but are not limited to AI-based visual content creation applications, presentation applications, website authoring applications, collaboration platforms, communications platforms, and/or other types of applications in which users may create, view, and/or modify various types of visual content collages. In the implementation shown in FIG. 1A, the application services platform 110 applies generative AI to easily generate fast and satisfactory visual content collage outputs upon user demand, according to the techniques described herein. The client device 105 and the application services platform 110 communicate with each other over a network (not shown). The network may be a combination of one or more public and/or private networks and may be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1A includes a single client device 105, other implementations may include a different number of client devices that utilize services provided by the application services platform 110.

The term "visual content item" refers to any human visible content item. Common forms of visual content items include photos, diagrams, charts, images, infographics, videos, animations, screenshots, memes, slide decks, pictograms, ideograms, gaming interfaces, software application backgrounds, graphic designs (e.g., publication, email marketing templates, presentations, menus, social media ads, banners and graphics, marketing and advertising, packaging, visual identity, art and illustration graphic design, and the like), etc.

As used herein, the term "visual content collage" is a combination of multiple individual visual content items digitally cut and pasted into a single visual content item. Generally, the visual appearance of each individual visual content item is maintained in the visual content collage. Some of the different styles of collages include grid, mosaic, shaped, vintage, pop art, surreal, abstract, themed, and the like. For instance, a visual content collage can tell a story, create a mood, or showcase multiple photos in a creative way.

A visual content "theme" is a unifying concept or idea that guides the visual elements of a design project. It helps to convey a specific message or atmosphere and create a cohesive and consistent look and feel for the project. Common elements of a visual content theme include color palette, typography, imagery (e.g., photographs, illustrations, or icons), layout, style (e.g., minimalist, retro, or modern), and the like.

Although various embodiments are described with respect to photo collages, it is contemplated that the approach described herein may be used with any visual content collages, such as videography, animation, motion graphics, user interface graphic design (e.g., game interface, app design, etc.), presentations, menus, social media ads, banners and graphics, marketing and advertising, packaging, visual identity, art and illustration graphic design, and the like.

The client device 105 includes a native application 114 and a browser application 112. The native application 114 is a web-enabled native application, in some implementations, which enables easy visual content collage generation. The web-enabled native application utilizes services provided by the application services platform 110 including but not limited to creating, viewing, and/or modifying various types of visual content collage generation. The native application 114 implements a user interface 205 shown in FIGS. 2A-2F in some implementations. In other implementations, the browser application 112 is used for accessing and viewing web-based content provided by the application services platform 110. In such implementations, the application services platform 110 utilizes one or more web applications, such as the browser application 112, that enables users to view, create, and/or modify visual content collage generation using for example an online application. The browser application 112 implements the user interface 205 shown in FIGS. 2A-2F in some implementations. The application services platform 110 supports both the native application 114 and the browser application 112 in some implementations, and the users may choose which approach best suits their needs.

The application services platform 110 includes a request processing unit 122, a prompt construction unit 124, generative model(s) 126, a user database 128, an image processing unit 130, an enterprise data storage 140, and moderation services (not shown).

The request processing unit 122 is configured to receive requests from the native application 114 and/or the browser application 112 of the client device 105. The requests may include but are not limited to requests to create, view, and/or modify various types of visual content collages and/or sending prompts to generative model(s) 126 (e.g., an image generative model) to generate visual content collages according to the techniques provided herein.

Figure 1B:
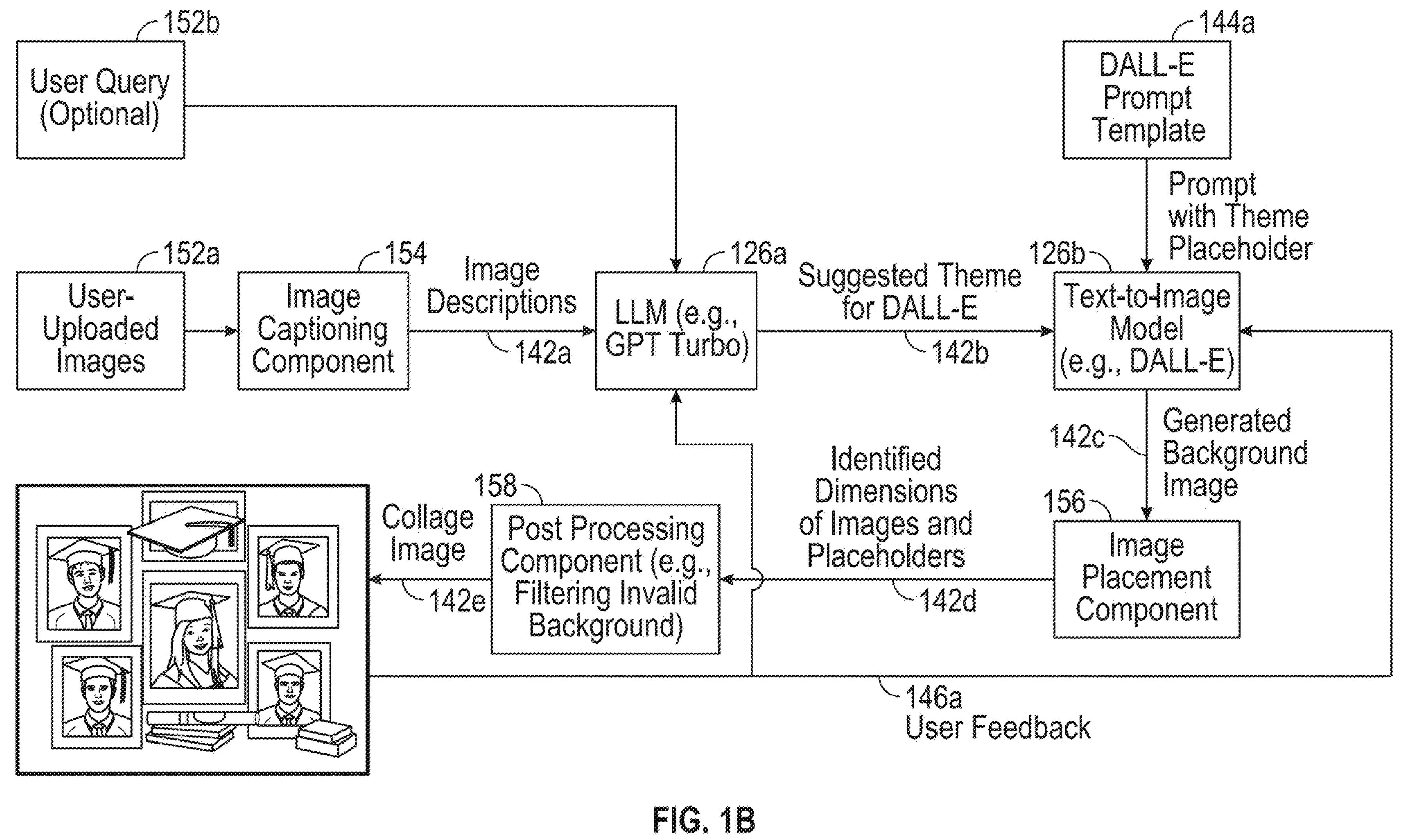
FIGS. 1B-IC are conceptual diagrams of a visual content collage generation pipeline of the system of FIG. 1A according to principles described herein.
Figure 1C:
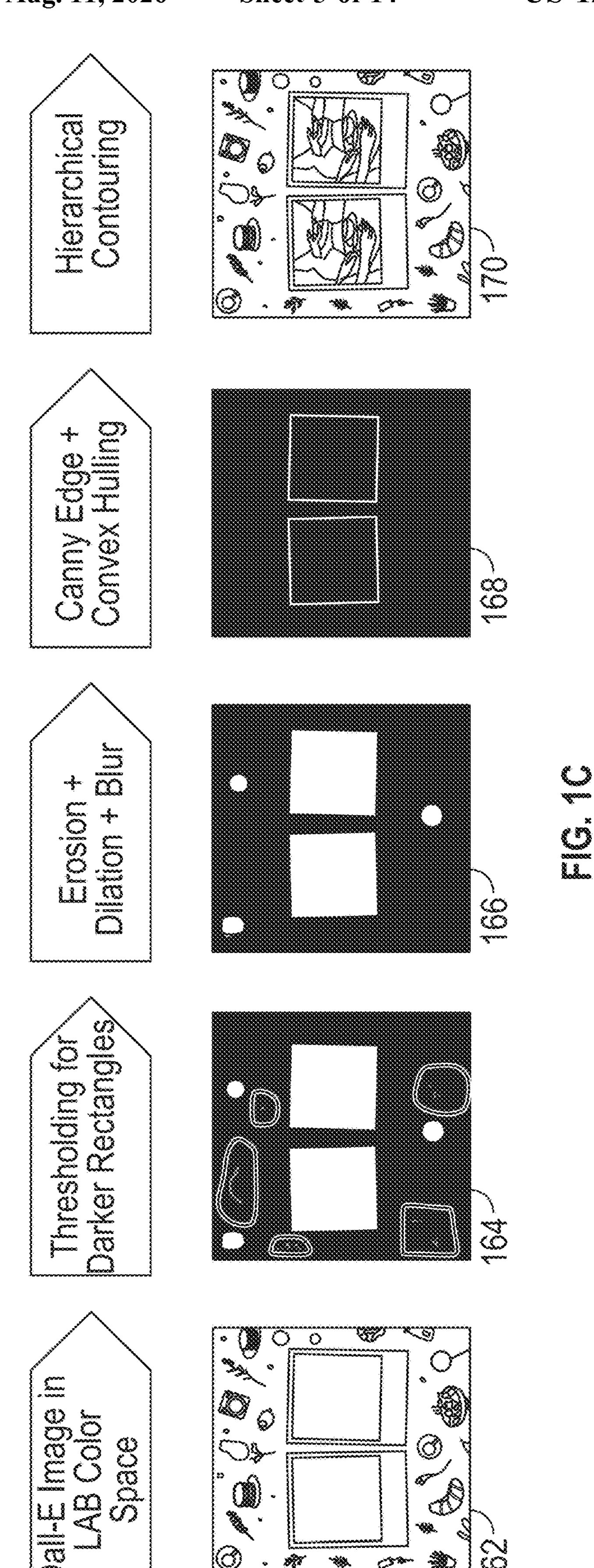

FIGS. 1B-1C are conceptual diagrams of a visual content collage generation pipeline of the system of FIG. 1A according to principles described herein. The pipeline leverages the advanced capabilities of LLMs and LVMs in the visual content collage generation pipeline. This pipeline is designed to generate visual content collages based on user-uploaded images, e.g., utilizing images as a prompt.

FIG. 1B is a conceptual diagram of a visual content collage generation pipeline of the system of FIG. 1A according to principles described herein. In FIG. 1B, the request processing unit 122 receives user-uploaded images 152*a*, and forwards it to an image captioning component 154 to convert the images into image descriptions/captions 142*a*. To understand the user-uploaded images 152*a*, the image captioning component 154 interprets the images, and generates descriptions/captions 142*a* that describe the user-uploaded images 152*a*. The descriptions/captions 142*a* are then converted into a theme 142*b* by sending an LLM prompt to the LLM 126*a* to determine the theme 142*b*.

In one embodiment, the image captioning component 154 (e.g., Azure® Image Captioning Service) recognizes the context of an image and generates a textual description/caption of the image using, for example, deep learning and computer vision, without applying LLMs. In another embodiment, the image captioning component 154 leverages the LLM 126*a* to generate image captions.

The captions are then used to generate a prompt for a model that determines the theme. For instance, the LLM prompt (e.g., a GPT Turbo Prompt in Table 1) includes the descriptions/captions 142*a* of all the user-uploaded images 152*a*, and the LLM 126*a* derives the theme 142*b*, and/or other elements needed in a background image 142*c*. For example, the LLM 126*a* summarizes the descriptions/captions 142*a* into the theme 142*b*.

TABLE 1

| |
|---|
| You are an assistant that helps in driving insights from user content which will be used to make creative photo albums. There will be a bunch of user uploaded images along with an optional user entered prompt. You will be provided with a list of image descriptions corresponding to each image and their descriptions are extracted from a machine learning model made for image captioning. Hence, the descriptions may not accurately represent the image as a whole because they might not include the exact time, place, mood, occasion, subject, and context of the images. \n\nYou will be given input in the following json format where \"User Prompt\" may be empty:\n{\n \"User Prompt\":\"\",\n \"Image Descriptions\": [ ]\n}\n\nYour task is to think about how these image descriptions, and the user prompt (if not empty) can both be related and respond accordingly. Your response should be structured in the following JSON format which contains the field names as keys and instructions for response as value. In your responses, keep in mind to give more weightage to the user prompt if it makes sense and is legitimate, and make sure to balance being generic and specific, based on your confidence level of a consistent story emerging from some or all image descriptions and the user entered prompt, knowing that all image descriptions are from a machine learning model and may not be coherent or accurate. Irrespective of the provided input, strictly adhere to the following Json format for your response and do not include your reasoning:\n{\n \"Design Theme\": \"Suggest a Design Theme in one or two words only based on your understanding of what the provided image descriptions collectively are trying to represent. Try to provide as much context as possible in the Design Theme, add context of different global cultures and demographics, if applicable to avoid being too generic. This value will be used to decide the visual styling of the photo album. Try to be precise here rather than being creative.\",\n \"Title\": \"Basis your best guess of the story emerging, suggest a suitable title for the cover page of photo album. If the user prompt asks for a particular text to be added, use that instead. \", \n \"Subtitle\": \"Suggest a suitable subtitle for the cover page of photo album, that goes with the suggested 'Title'\",\n \"Suggested Color\": \"Suggest a suitable color theme that accents the emerging story from the image description and user prompt\", \n \"Suggested Objects\": \"Suggest at most 4 objects that can serve as illustrations to beautify the photo album. The values must be comma-separated.\"\n}\n\nDiscard everything and anything that's not part of this JSON structure. |

The meta prompt in Table 1 also includes a negative prompt (e.g., "do not include your reasoning") to steer the LLM 126*a* away from its own reasoning. A negative prompt is the opposite of a positive prompt, which is used to guide the model towards generating the specific type of content. In other embodiments, the meta prompt can include a negative prompt to avoid generating a "low quality," "violent," or "hateful" theme.

In response to receiving the prompt, the LLM 126*a* generates the theme 142*b*. The pipeline then sends the theme 142*b* and/or the other elements needed in the background image 142*c* to a text-to-image model 126*b* (e.g., DALL-E 3), to create the background image 142*c* that matches the theme 142*b*. The background image 142*c* has placeholders 142*d* for inserting the user-uploaded images 152*a*. In one embodiment, the pipeline provides detailed guidance with a meta prompt (e.g., a DALL-E prompt template 144*a*) to create frames hanging on a wall as shown in Table 2. Here #IMAGE_COUNT is replaced by the number of user uploaded images and #THEME is replaced by the theme (e.g., the theme 142*b*) determined by the LLM 126*a*. In an example, the prompt is generated using a script that includes blank spaces for the number uploaded images and the theme.

TABLE 2

| |
|---|
| A wall with #IMAGE_COUNT large empty white frames, each with large empty slot filled with solid black color. Leave ample space between the frames. All frames should be hanging on a vibrant #THEME theme wall with gentle colors. |

In another embodiment, the pipeline provides detailed guidance with a meta prompt (e.g., a DALL-E prompt template 144*a*) to create polaroids on a background as shown in Table 3.

TABLE 3

| |
|---|
| An image collage of '#IMAGE_COUNT' rectangular empty polaroids, each with large empty slot filled with solid black color. Leave ample space between the slots. All slots should be placed on a subtle '#THEME' theme background with gentle colors. |

The pipeline then uses an image processing algorithm (e.g., an image placement component 156) which may be an algorithm that detects the placeholders 142*d* in the background image 142*c* based on contour detection and other operations (e.g., erosion, dilation, convex hulling, and the like) to identify characteristic of the placeholders 142*d*, such as locations, sizes/dimensions, orientations, and the like. In addition, the image placement component 156 can resize, rotate, and/or crop the user-uploaded images 152*a* to fit into the placeholders 142*d* based on their matching characteristic, and create a composite image (e.g., a collage image 142*e*).

Optionally, the pipeline applies a post processing component 158 to filter out invalid background image(s), such as when the background image 142*c* has more or fewer placeholders than the user-uploaded images 152*a*, when the placeholders 142*d* are too small/big to fit the user-uploaded images 152*a* with sufficient resolutions (e.g., meeting upper and/or lower resolution thresholds), and the like.

In one embodiment, the pipeline further provides prompt refinement through at least another generative model call, such as calling the LLM 126*a* and/or the text-to-image model 126*b* based on user feedback data 146*a* sent via a feedback loop (e.g., a quality prediction model, and/or a reflection loop based on a confidence threshold).

In one embodiment, the meta prompt in Table 1 can be a self-improving agent that can modify its own instructions based on its reflections on user interactions, such as a user selection of a thumbs-up tab, a thumbs-down tab, a neutral tab, or a generating-more-image tab, a textual input, or the like, regarding the collage image output. In another embodiment, the DALL-E prompt template 144*a* in Table 2 can include instructions that guides the AI on how to improve its own instructions based on user positive, neutral, or negative feedback on the collage image 142*e*, such as a user selection of a thumbs-up tab, a thumbs-down tab, a neutral tab, or a generating-more-image tab, a textual input, or the like, regarding the collage image output. The pipeline can then create other collage image output(s) based on the refined meta prompt(s), and serve the other collage image output(s) to the user.

FIG. 1C is a conceptual diagram of image placement of the system of FIG. 1A according to principles described herein. In FIG. 1C, the image placement component 156 converts a background image (e.g., the background image 142*c*, an image 162, etc.) into a LAB color space. The LAB color space separates color information into three channels: L stands for lightness ranging from black to white, A stands for green-red axis (negative values for green, positive for red), while B stands for blue-yellow axis (negative for blue, positive for yellow). Working in the LAB color space enables adjustment of colors in DALL-E's images more precisely and intuitively, thereby achieving specific color effects or matching desired color schemes. The image 162 includes two dark rectangles laid over two white rectangles, three black dots, and many other color artifacts. In this case, converting the image 162 from RGB into the LAB color space helps to better separate out the darks for later thresholding/binarizing the image 162.

The image placement component 156 binarizes each of a plurality of pixels of the LAB image into either a black pixel or a white pixel to generate an image 164. For instance, the image placement component 156 thresholds the LAB image to set the darker pixels to 255 and the lighter pixels to 0. The image 164 thus becomes black and white, with two white rectangles, three white dots, and some artifacts marked in lines.

The image placement component 156 removes one or more of the artifacts from the image 164 by applying erosion, dilation, and/or blurring techniques/algorithms on the image 164 into an image 166. The Open Source Computer Vision Library (OpenCV) is a powerful tool for computer vision tasks such as image processing, object detection, video analysis, and the like. Erosion can be implemented via cv2.erode(image, kernel, iterations) in OpenCV (Python), to erode foreground pixels and remove small objects and noise. Dilation can be implemented via cv2.dilate(image, kernel, iterations) in OpenCV, to expand foreground pixels and fill boles and gaps. Blurring can be implemented via cv2.GaussianBlur(image, (kernel_size, kernel_size), sigmaX) in OpenCV, to reduce noise and smooth edges. For instance, the image placement component 156 applies erosion by convolution with a 5×5 kernel for 2 iterations which results in 1 only if all the pixels under the kernel are 1. In addition, the image placement component 156 applies dilation by convolution with a 5×5 kernel for 2 iterations which results in 1 only if any one pixel under the kernel is 1. Other techniques to apply erosion, dilation and/or blurring can also be used.

The image placement component 156 extracts edges of one or more of the remaining artifacts in the image 166 and connects one or more broken edges among the extracted edges in an image 168. Canny edge detection can be implemented via cv2.Canny(image, threshold1, threshold2) in OpenCV, to detect edges in images. Convex hull can be implemented via cv2.convexHull(points) in OpenCV (for point sets), to find the smallest convex polygon that encloses a set of points. For instance, the image placement component 156 applies canny edge detection by extracting just the edges while eliminating extra fill noise. In addition, the image placement component 156 applies convex hulling by completing the shapes which are broken due to being overlapped by objects. In this case, the image 168 includes two placeholders.

The image placement component 156 applies hierarchical contours on the image 168, and selects the complete noise-free leaf node contours as placeholders for a collage image 170. Hierarchical contouring can be implemented via libraries like OpenCV or scikit-image (Python), to detect contours at multiple levels of detail. Those contours which are non-polygonal and with a contour area to image area ratio below a threshold are irrelevant and thus eliminated to arrive at the final relevant image placeholders.

In some implementations, each generative model call needs to pass a responsible AI test. In one embodiment, a responsible AI test is a comprehensive evaluation process that ensures a generative model adheres to ethical principles and operates safely and fairly in the real world. In another embodiment, the test not only checks if the generative model performs its intended task accurately, but also assess its potential for harm and mitigating negative impacts.

In some implementations, instead of the user-uploaded image 152*a*, the pipeline additionally receives a user query 152*b*, and includes the user query 152*b* with the descriptions/captions 142*a* to the LLM 126*a* for extracting the theme 142*b*.

In other implementations, instead of collage creation based on one or more images as the above-discussed example, the pipeline can generate other visual content collage outputs (e.g., diagrams, charts, infographics, videos, animations, screenshots, memes, slide decks, pictograms, ideograms, gaming interfaces, software application backgrounds, graphic designs, or the like). For example, the pipeline can generate a visual content collage based on a sequence of wedding anniversary videos.

In some implementations, the system makes the collage image 142*e* produced by the pipeline editable, such as adding textual content in the collage image 142*e*, thus offering more user control over their AI-based collage generation experiences. For instance, after the collage image 142*e* is generated, either the LLM model 126*a* or the text-to-image model 126*b* can preformulate meta-prompt(s) for querying the user for more user intent details, such as purpose(s), usage(s), and the like of the collage, and then adding more content to the collage image 142*c*.

In another embodiment, the prompt construction unit 124 can use user data from various user data source(s) to generate information relating to the purpose(s), the usage(s), and the like of the collage. For instance, user activity data can be digitized and stored in the user database 128 for extracting/inferring the purpose(s), the usage(s), and the like of the collage. The user data source(s) can be online/offline databases (e.g., emails, social media posts, and the like), documents, articles, books, presentation content, and/or other types of content containing user activity information.

In one embodiment, in response to the user-uploaded images 152*a* and/or the user query 152*b*, the prompt construction unit 124 retrieves user activity data from the user database 128 based on an indication identifying the user. The indication may be a user identifier (e.g., a username, an email address, and the like), and/or other identifier associated with the user that the application services platform 110 can use to identify the user and retrieve user data. The user data can include a username, a user organization, a user preferred collage style (e.g., grid, mosaic, shaped, vintage, pop art, surreal, abstract, themed, and the like), and the like. As such, the prompt construction unit 124 may retrieve the user information from the user database 128, to refine the collage output(s).

The LLM 126*a* can be any language generative model trained to generate textual content describing visual prompts with details/nuances and accuracy. For instance, the LLM 126*a* may be GPT turbo, Imagen, Contrastive Language-Image Pretraining (CLIP), Flamingo, Perceiver, Multitask Unified Model (MUM), or the like.

The text-to-image model 126*b* can be any visual generative model trained to generate visual content (e.g., image, video, and the like) in response to natural language prompts. For instance, the text-to-image model 126*b* may be DALL-E, CLIP, Vision Transformer (ViT), Megatron-Turing NLG, Imagen, GauGAN2, VQGAN+CLIP, SDXL Turbo, Stable Diffusion XL, Stable Diffusion Waifu Diffusion, Realistic Vision, MeinaMix, Anything V3, DreamShaper, Protogen, Elldreths Retro Mix, Modelshoot, or the like. In some implementations, the system selects a text-to-image model based on factors such as open source, photorealistic, creative control, computational requirements, case of use, licensing, and the like. The less sophisticated a text-to-image model, the more meta prompting and/or additional tools/models are required to provide the same quality image outputs. In one embodiment, the first and second generative models are embodied in one large multimodal model (LMM), such as Imagen, CLIP (Contrastive Language-Image Pre-Training), FLAN-T5, Flamingo, NuMesh, Gato, or the like.

In one embodiment, the meta data of the background images and/or the collages are saved in a visual content library 142 as user preferred collage style data to individualize the collage output(s) for the user in the future. Other implementations may utilize other models or other generative models to generate visual content collage(s) based on considerations of open source, photorealistic, creative control, computational requirements, case of use, licensing, and the like. The generative model(s) 126 may be included as part of the application services platform 110 or they may be external models that are called by the application services platform 110. In implementations where other models in addition to the generative model(s) 126 are utilized, those models may be included as part of the application services platform 110 or they may be external models that are called by the application services platform 110.

The request processing unit 122 coordinates communication and exchange of data among components of the application services platform 110 as discussed in the examples which follow. The request processing unit 122 receives user input(s) (e.g., the user-uploaded images 152*a*, the user query 152*b*, or the like) to generate collage(s) via the native application 114 or the browser application 112.

The prompt construction unit 124 may reformat or otherwise standardize any information to be included in the prompt to a standardized format that is recognized by the generative model(s) 126. The generative model(s) 126 is trained using training data in this standardized format, in some implementations, and utilizing this format for the prompts provided to the generative model(s) 126 may improve the output quality provided by the generative model(s) 126.

In some implementations, when the user data (e.g., user activity data, preferences, etc.) from the user database 128 is already in the format directly processible by the generative model(s) 126, the prompt construction unit 124 does not need to convert the user data. In other implementations, when the user data is not in the format directly processible by the generative model(s) 126, the prompt construction unit 124 converts the user data to the format directly processible by the generative model(s) 126. Some common standardized formats recognized by a language model include plain text, HTML, JSON, XML, and the like. In one embodiment, the system converts user data into JSON, which is a lightweight and efficient data-interchange format.

Some common formats recognized by a LMM include JPEG (Joint Photographic Experts Group), PNG (Portable Network Graphics, TIFF (Tagged Image File Format), BMP (Bitmap Image File), GIF (Graphics Interchange Format), PSD (Photoshop Document), RAW, SVG (Scalable Vector Graphics), WEBP, OpenEXR, or the like.

The application services platform 110 complies with privacy guidelines and regulations that apply to the usage of the user data included in the user database 128 to ensure that users have control over how the application services platform 110 utilizes their data.

The visual content library 142 (storing e.g., image descriptions/captions, themes, background images, collage images, or the like), request, prompts and responses 144, extracted/inferred user data 146 (e.g., user activities, preferences, feedbacks, or the like), and other asset data 148 are stored in the enterprise data storage 140. The extracted/inferred user data 146 (e.g., activities, preferences, feedbacks, or the like) is tentatively linked with a user ID during a user session and saved in a cache. After the user session, extracted/inferred user data 146 is de-linked form the user ID as metadata of the background image(s), and/or the resulted collage image(s) and saved in the visual content library 142. In addition, the extracted/inferred user data 146 linked with the user ID is saved back to the user database 128.

The enterprise data storage 140 can be physical and/or virtual, depending on the entity's needs and IT infrastructure. Examples of physical enterprise data storage systems include network-attached storage (NAS), storage area network (SAN), direct-attached storage (DAS), tape libraries, hybrid storage arrays, object storage, and the like. Examples of virtual enterprise data storage systems include virtual SAN (vSAN), software-defined storage (SDS), cloud storage, hyper-converged Infrastructure (HCI), network virtualization and software-defined networking (SDN), container storage, and the like.

FIGS. 2A-2F are diagrams of an example user interface of an AI-based visual content collage generation application that implements the techniques described herein. The example user interface shown in FIGS. 2A-2F is a user interface of an AI-based visual content collage generation application within an AI-based design platform, such as but not limited to Microsoft Designer®. However, the techniques discussed herein for AI-based visual content collage generation are not limited to use in an AI-based design platform and may be used to generate visual content for other types of applications including but not limited to presentation applications, website authoring applications, collaboration platforms, communications platforms, social media applications, e-commerce applications, and/or other types of applications in which users create, view, and/or modify various types of visual content. Such applications can be a mini application in an AI-based design application, a stand-alone application, or a plug-in of any application on the client device 105, such as the browser application 112, the native application 114, and the like. For example, the system can work on the web or within a virtual meeting and collaboration application (e.g., Microsoft Teams®) or an email application (e.g., Outlook®). The system can be integrated into the Microsoft Viva® platform or could work within a browser (e.g., Windows® Edge®). The system can also work within a social media website/application (e.g., Facebook®, Instagram®).

Figure 2A:
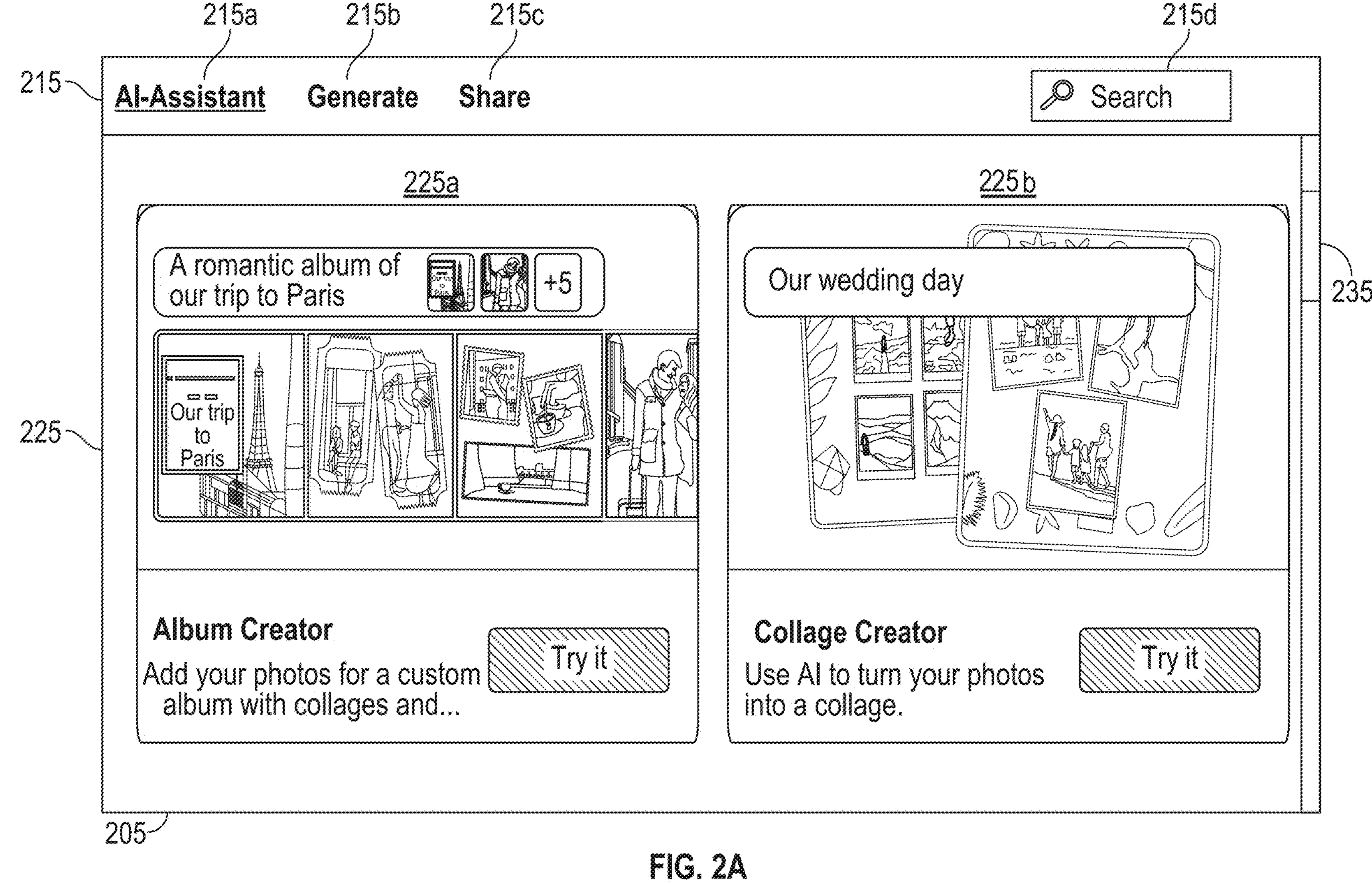
FIGS. 2A-2F are diagrams of example user interfaces of an AI-based visual content collage generation application that implements the techniques described herein.

FIG. 2A shows an example of the user interface 205 of an AI-based visual content collage generation application in which the user is interacting with AI generative model(s) to generate an image output with desired style(s) and topic(s). The user interface 205 includes a control pane 215, a chat pane 225 and a scrollbar 235. The user interface 205 may be implemented by the native application 114 and/or the browser application 112.

In some implementations, the control pane 215 includes an Assistant button 215*a*, a Generate button 215*b*, a Share button 215*c*, and a search field 215*d*. The AI-Assistant button 215*a* can be selected to provide visual content collage generation assistant functions as later discussed. In some implementations, the chat pane 225 provides a workspace in which the user can enter prompts in the AI-based visual content collage generation application for generating image output(s) with desired style(s) and topic(s). In the example shown in FIG. 2A, the chat pane 225 shows at least two mini application tiles 225*a* and 225*b*.

The mini application tile 225*a* represents an album creator and depicts a description of "Add your photos for a custom album with collages and animations." The mini application tile 225*a* also depicts a prompt enter box over a background image and a "Try it" button. The prompt enter box shows a user query example of "A romantic album of our trip to Paris," and thumbnails of some user-uploaded photos.

The mini application tile 225*b* represents a collage creator and depicts a description of "Use AI to turn your photos into a collage." The mini application tile 225*b* also depicts a prompt enter box over a background image and a "Try it" button. The prompt enter box shows a user query example of "Our wedding day."

The mini application tiles 225*a*, 225*b* invite a user to drag and drop images and optionally a natural language query for automatically generating a collage image by the generative model(s) 126 of the application services platform 110. The application services platform 110 processes the request according to the techniques provided herein to generate collage image output(s).

Alternatively, the user can select the Generate button 215*b* to generate collage image output(s). The Share button 215*c* can be selected to trigger a dropdown list of applications to share the collage image output(s) (e.g., the collage image 142*c*). For example, the user can post the collage image output(s) on a social media application (e.g., Facebook®) to celebrate the user's wedding anniversary. The search field 215*d* is for a user to enter a search word, phrase, paragraph, and the like within the visual content library 142. The fields in the visual content collage application can provide auto-fill and/or spell-check functions.

In the example shown in FIG. 2A, the mini applications 225*a*, 225*b* invite the user to upload five images, for example, to generate a collage image. In other implementations, the mini applications 225*a*, 225*b* invite the user to upload as many as images as the user want, then rank and select only five images to generate a collage image in a user preferred collage style. The image ranking can be based on contextual data, such as user preferences, user data, events, time, locations, and the like. Subsequently, the ranking can be applied to determine how to place the five selected images in the collage image in the five placeholders in conjunction with the positions, sizes, and/or orientations of the placeholders. In this example, five is a good number of user-uploaded images to fit in a grid-style collage to present on most client device user interfaces. When the pipeline or the user select the mosaic collage style, the suggested number of user-uploaded images can be any number, for example, depending on user intent and/or preferences.

Figure 2B:
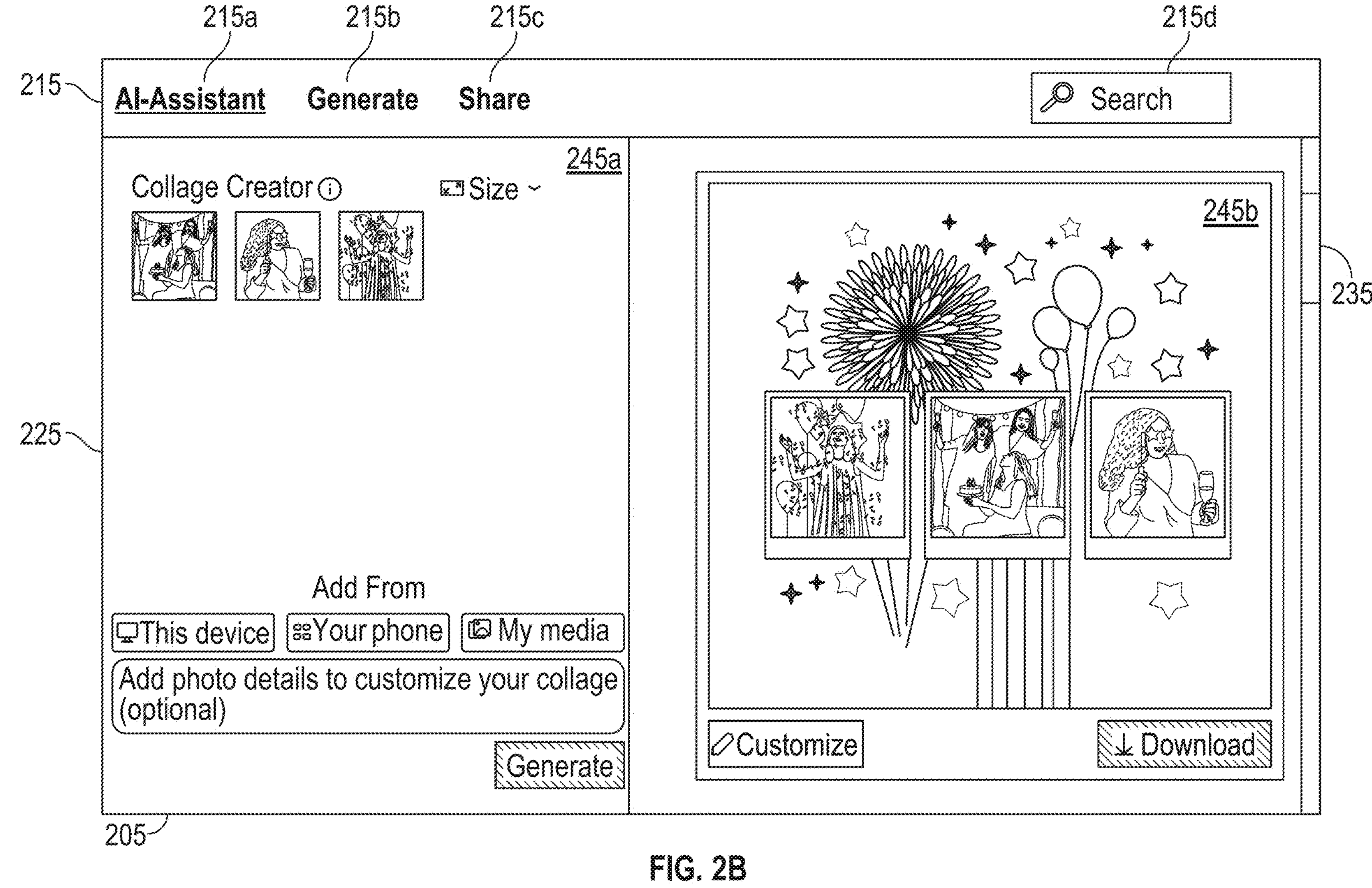

FIG. 2B continues from FIG. 2A upon a selection of the mini application tile 225*b*. In this example, on the left side, the chat pane 225 shows an image pane 245*a* with three images that could be retrieved from a current device, a phone, and/or a media by selecting a "This Device" button, a "Your Phone" button, and/or a "My Media" button. The chat pane 225 shows an instruction of "Add photo details to customize your collage (optional)" and a field for receiving such user natural language input (e.g., "An office party"). The chat pane 225 shows another Generate button to generate collage image output(s). On the right side, the chat pane 225 shows a collage image output 245*b* with mages inserted in three placeholders. The chat pane 225 shows a Customize button to customize the collage image output 245*b*, and a Download button to download the collage image output 245*b*.

Figure 2C:
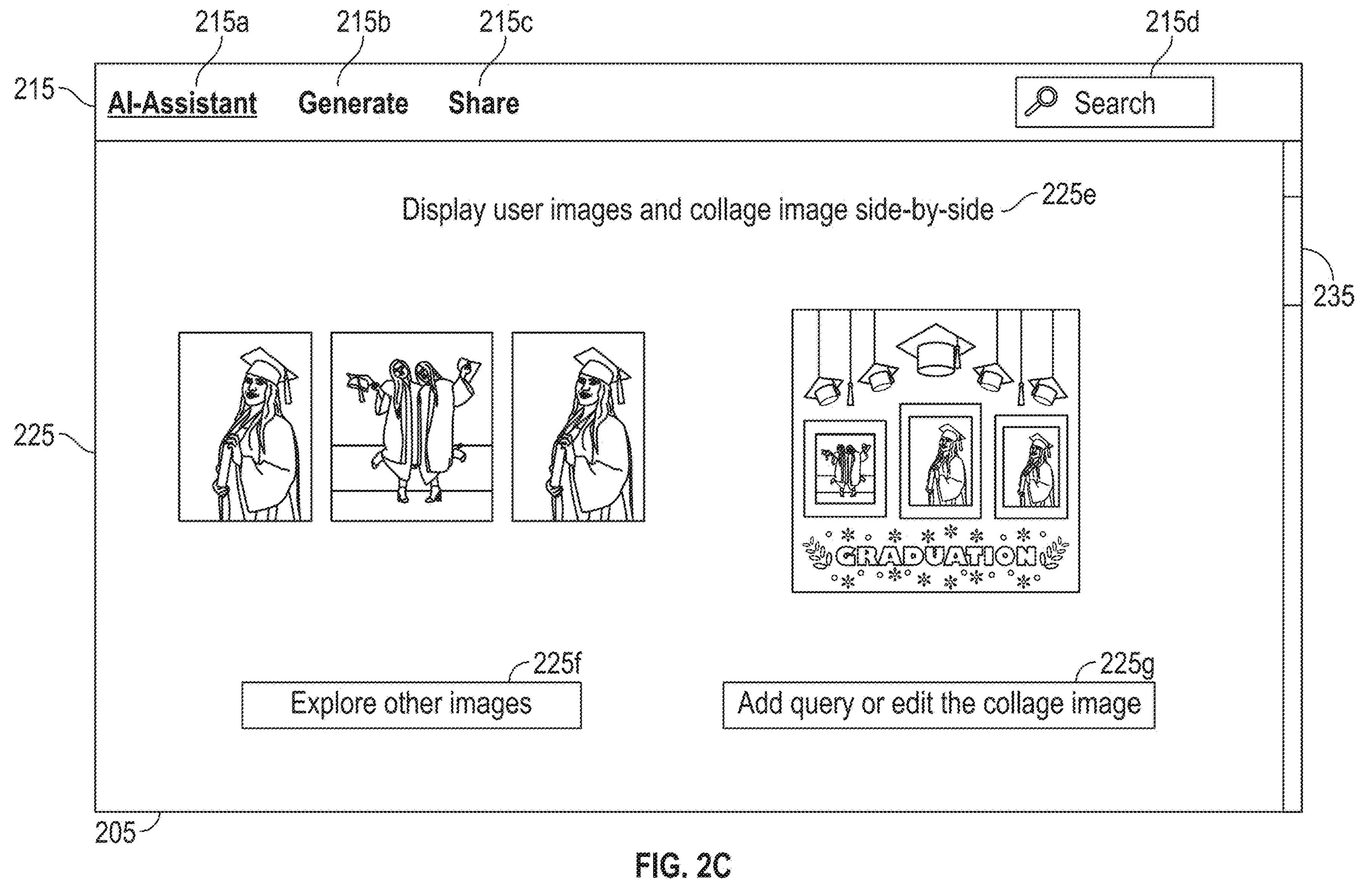

FIG. 2C continues from FIG. 2A upon a selection of another set of images (e.g., college graduation images) in a field 225*f* while maintaining the same grid style. In this example, the pipeline extracts a theme as "graduation day" from the images. The chat pane 225 shows a prompt enter box 225*e* with an instruction of "Display user images and collage image side-by-side", the field 225*f* with an instruction of "Explore other images", a field 225*g* of "Add query or edit the collage image," and the respective user images of the graduation day and the collage image incorporating three user images.

Figure 2D:
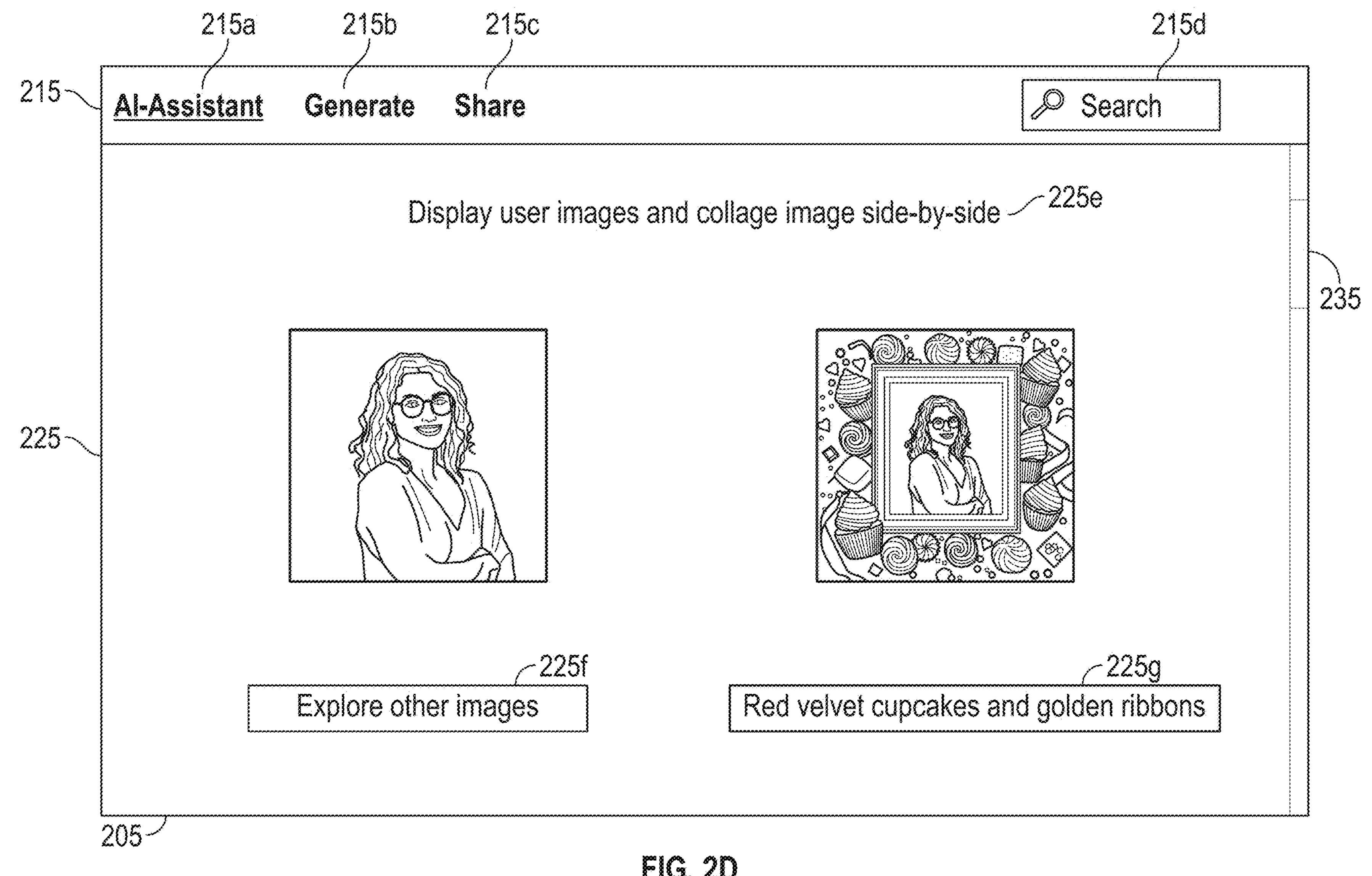

FIG. 2D continues from FIG. 2A upon uploading one image (e.g., a user portrait image) and a user input of "red velvet cupcakes and golden ribbons" in the field 225*g*. In this example, the pipeline extracts a theme as "celebration" from the images. The chat pane 225 shows the prompt enter box 225*e* with the instruction of "Display user images and collage image side-by-side" and the respective user portrait image and the collage image with the user portrait image in a background of red velvet cupcakes and golden ribbons.

Figure 2E:
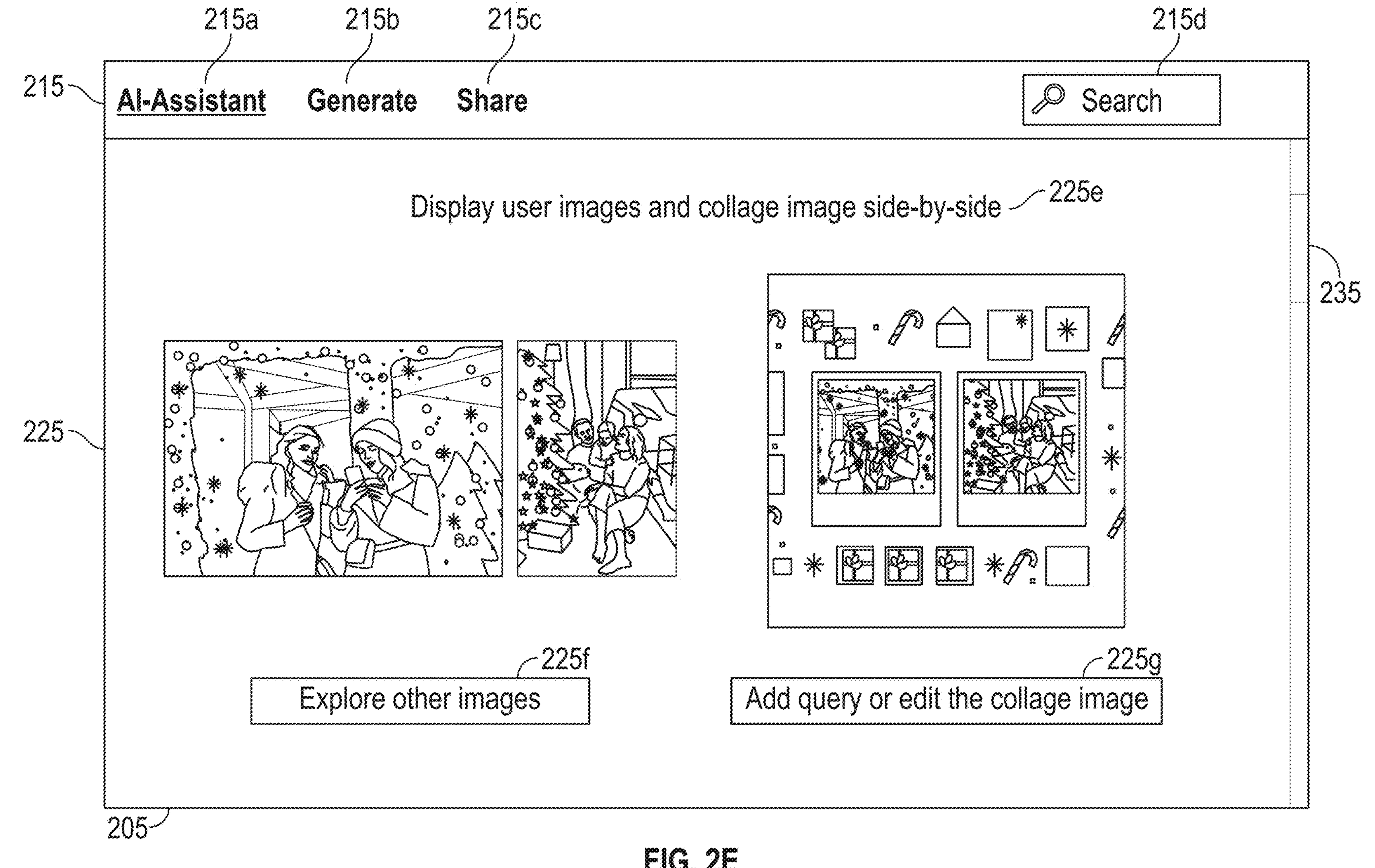

FIG. 2E continues from FIG. 2A upon uploading another set of images (e.g., family Christmas images) in the field 225*f* while maintaining the same grid style. In this example, the pipeline extracts a theme as "Christmas celebrations" from the images. The chat pane 225 shows the prompt enter box 225*e* with the same instruction of "Display user images and collage image side-by-side" and the respective user family Christmas images and the collage image incorporating two user images.

Figure 2F:
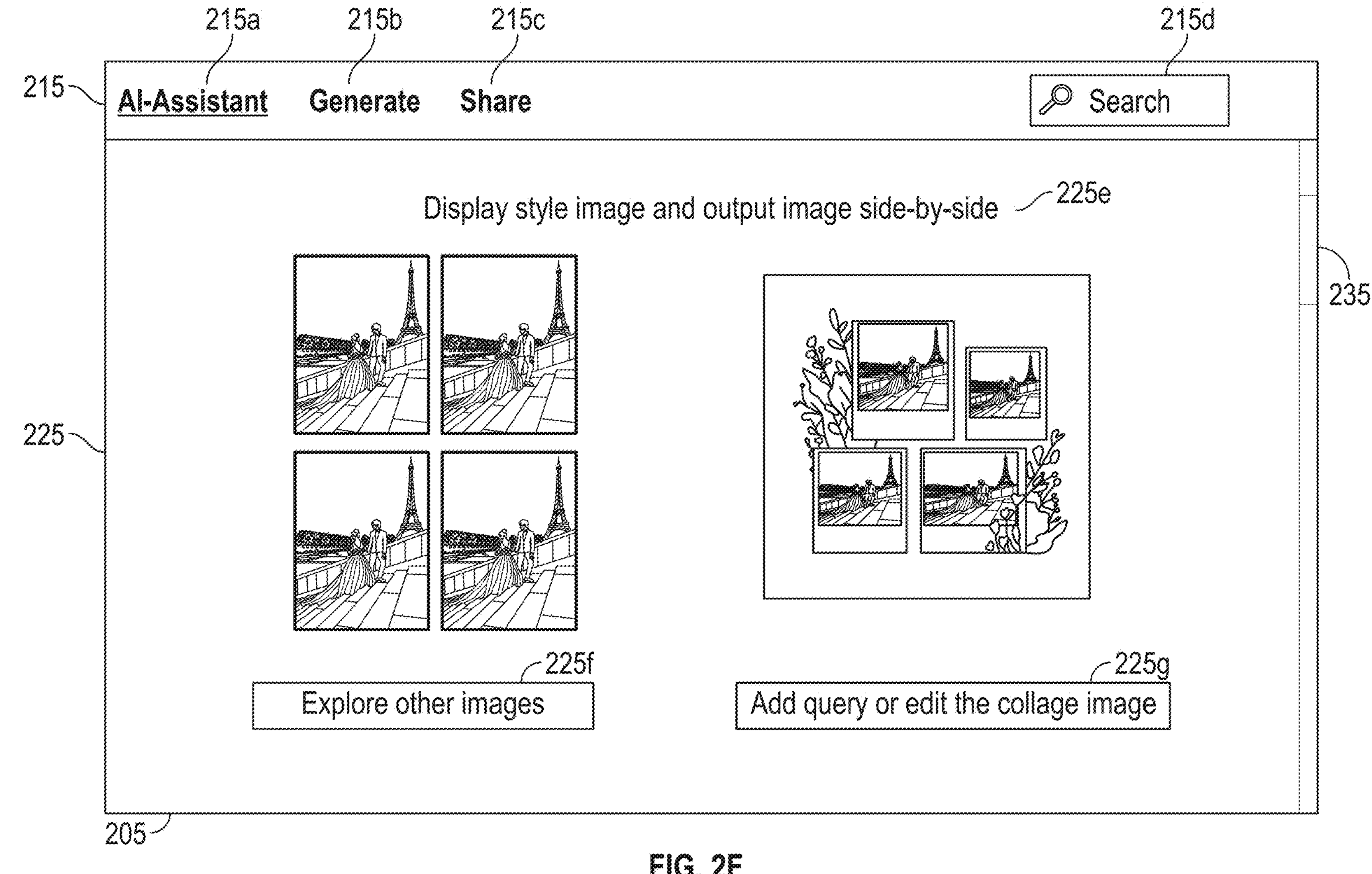

FIG. 2F continues from FIG. 2A upon uploading another set of images (e.g., Paris wedding images) in the field 225*f* while maintaining the same grid style. In this example, the pipeline extracts a theme as "wedding" from the images. The chat pane 225 shows the prompt enter box 225*e* with the same instruction of "Display user images and collage image side-by-side" and the respective user wedding images and the collage image incorporating four user images.

In some implementations, the pipeline provides a feedback loop by augmenting thumbs up and thumbs down buttons for each visual content collage output in the user interface 205. If the user dislikes a visual content collage output, the system can ask why and use the user feedback data to improve the generative model(s) 126. A thumbs down click could also prompt the user to indicate whether the visual content collage output was too bright, too dark, too big, too small, or was assigned the wrong style/topic, or the like.

Figure 3:
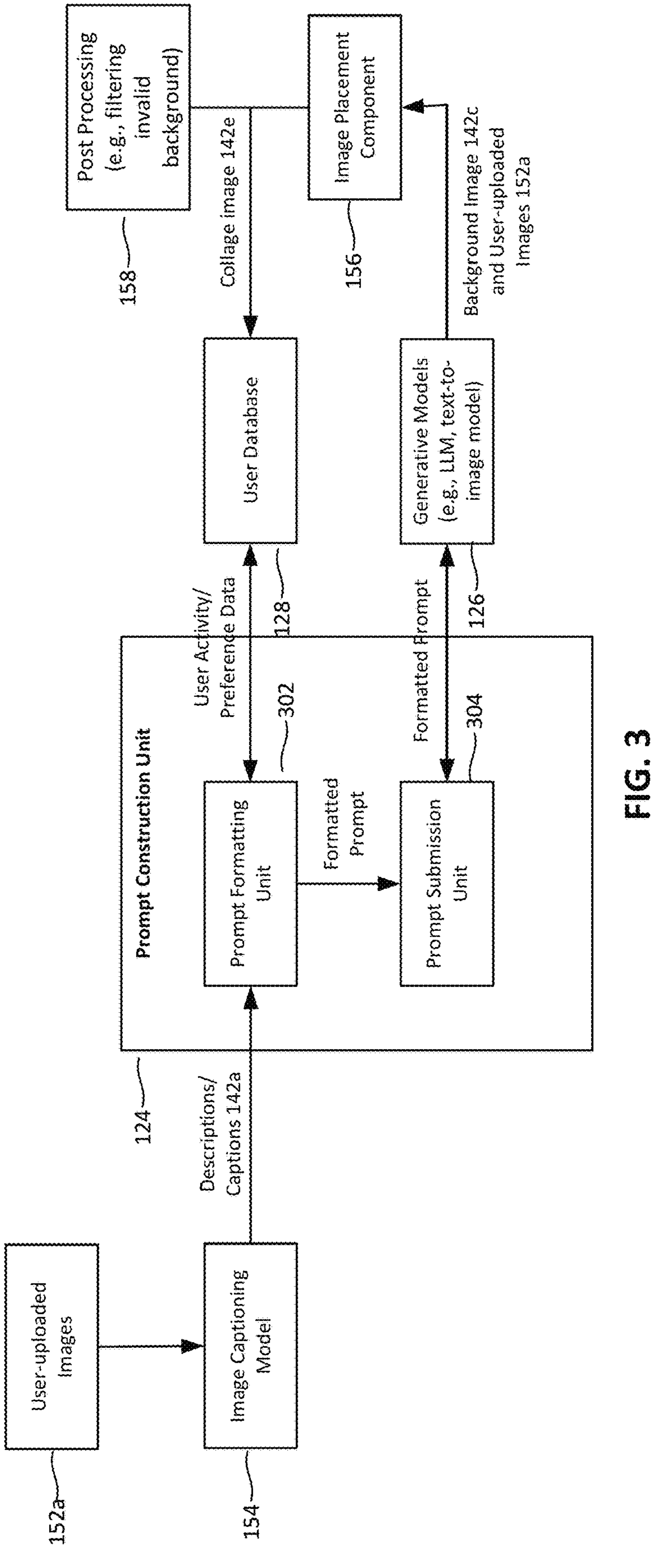
FIG. 3 is a diagram showing additional features of a prompt construction unit of the application services platform shown in FIG. 1A.

FIG. 3 is a diagram showing additional features of the prompt construction unit 124 of the application services platform shown in FIG. 1A. The prompt construction unit 124 formats and submits the prompt for the generative model(s) 126. The prompt construction unit 124 includes a prompt formatting unit 302 and a prompt submission unit 304.

The prompt formatting unit 302 receives the descriptions/captions 142*a* from the image captioning component 154 to extracts/infers from the descriptions/captions 142*a* and optionally user activity/preference data from the user database 128 into the theme 142*b*. In another embodiment, the prompt formatting unit 302 considers the user query 152*b* to extract/infer the theme 142*b*.

As necessary, the prompt formatting unit 302 can format the descriptions/captions 142*a*, the user activity/preference data, and the user query 152*b* according to a desired format, i.e., a format directly processible by the LLM 126*a* for extract the theme 142*b*. The prompt formatting unit 302 can format the theme 142*b* according to a desired format, i.e., a format directly processible by the text-to-image model 126*b*. Other implementations may include instructions in addition to and/or instead of one or more of these instructions. Furthermore, the specific format of the prompt may differ in other implementations.

The system can instruct the generative model(s) 126 to generate a single-shot prompt (i.e., including a single example or instruction to guide the generative model's response) or a multi-shot prompt (i.e., including multiple examples or instructions to give the model more context and improve its understanding of the task) for generating the virtual content collage output(s).

In some implementations, the application services platform 110 includes moderation services that analyze user prompt(s), content generated by the generative model(s) 126, and/or the user data obtained from the user database 128, to ensure that potentially objectionable or offensive content is not generated or utilized by the application services platform 110.

If potentially objectionable or offensive content is detected in the user data obtained from the user database 128, the moderation services provides a blocked content notification to the client device 105 indicating that the prompt(s), the user data is blocked from forming the meta prompt. In some implementations, the request processing unit 122 discards any user data that includes potentially objectionable or offensive content and passes any remaining content that has not been discarded to the request processing unit 122 to be provided as an input to the prompt construction unit 124. In other implementations, the prompt construction unit 124 discards any content that includes potentially objectionable or offensive content and passes any remaining content that has not been discarded to the generative model(s) 126 as an input.

In one embodiment, the prompt submission unit 304 submits the user prompt(s), and/or the meta prompt to the moderation services to ensure that the prompt does not include any potentially objectionable or offensive content. The prompt formatting unit 302 halts the processing of the meta prompt in response to the moderation services determining that the user data and/or prompt(s) includes potentially objectionable or offensive content.

The image processing unit 130 may include an OCR tool to identify text element(s) from a user-uploaded image, and send the text element(s) to the LLM 126*a* for determining the theme 142*b*. In some implementations, the OCR tool stores the text element(s) in editable characters for potential use. The image processing unit 130 can access the user database 128 for user input image data for pre-processing, such as identifying textual elements. The user database 128 can be implemented on the application services platform 110 in some implementations. In other implementations, at least a portion of the user database 128 is implemented on an external server that is accessible by the prompt construction unit 124.

As mentioned, the application services platform 110 complies with privacy guidelines and regulations that apply to the usage of the user data included in the user database 128 to ensure that users have control over how the application services platform 110 utilizes their data. The user is provided with an opportunity to opt into the application services platform 110 to allow the application services platform 110 to access the user data and enable the generative model(s) 126 to generate visual content according to the user's desired style/topic. In some implementations, the first time that an application, such as the native application 114 or the browser application 112 presents an AI assistant to the user, the user is presented with a message that indicates that the user may opt into allowing the application services platform 110 to access user data included in the user database 128 to support the visual content collage generation functionality. The user may opt into allowing the application services platform 110 to access all or a subset of user data included in the user database 128. Furthermore, the user may modify their opt-in status at any time by accessing their user data and selectively opting into or opting out of allowing the application services platform 110 from accessing and utilizing user data from the user database 128 as a whole or individually.

Referring back to the moderation services, the moderation services generates a blocked content notification in response to determining that the user prompt(s), and/or the meta prompt includes potentially objectionable or offensive content, and the notification is provided to the native application 114 or the browser application 112 so that the notification can be presented to the user on the client device 105. For instance, the user may attempt to revise and resubmit the user prompt(s). As another example, the system may generate another meta prompt after removing task data associated with the potentially objectionable or offensive content.

The prompt submission unit 304 submits the integrated text prompt to the text-to-image model 126*b*. The second text-to-image model 126*b* analyzes the integrated text prompt and generates a background image based on the integrated text prompt. The prompt submission unit 304 submits the background image to the image placement component 156 to detect the placeholders in the background image, and then resize, rotate, and/or crop the user-uploaded images to fit into the placeholders, to create a collage image.

The prompt formatting unit 302 can halt the processing of the visual content collage output(s) in response to the moderation services determining that the graphic design includes potentially objectionable or offensive content. The moderation services generates a blocked content notification in response to determining that the visual content collage output(s) includes potentially objectionable or offensive content, and the notification is provided to the prompt formatting unit 302. The prompt formatting unit 302 may attempt to revise and resubmit the integrated text prompt. If the moderation services does not identify any issues with the visual content collage output(s), the prompt submission unit 304 provides the visual content collage output(s) to the request processing unit 122. The request processing unit 122 provides the visual content collage output(s) to the native application 114 or the browser application 112 depending upon which application was the source of the user-uploaded images.

The moderation services can be implemented by a machine learning model trained to analyze the content of these various inputs and/or outputs to perform a semantic analysis on the content to predict whether the content includes potentially objectionable or offensive content. The specific checks performed by the moderation services may vary from implementation to implementation.

In some implementations, the moderation services generates a blocked content notification, which is provided to the client device 105. The native application 114 or the browser application 112 receives the notification and presents a message on a user interface of the application that the user prompt received by the request processing unit 122 could not be processed. The user interface provides information indicating why the blocked content notification was issued in some implementations. The user may attempt to refine a natural language prompt to remove the potentially offensive content. A technical benefit of this approach is that the moderation services provides safeguards against both user-created and model-created content to ensure that prohibited offensive or potentially offensive content is not presented to the user in the native application 114 or the browser application 112.

Figure 4A:
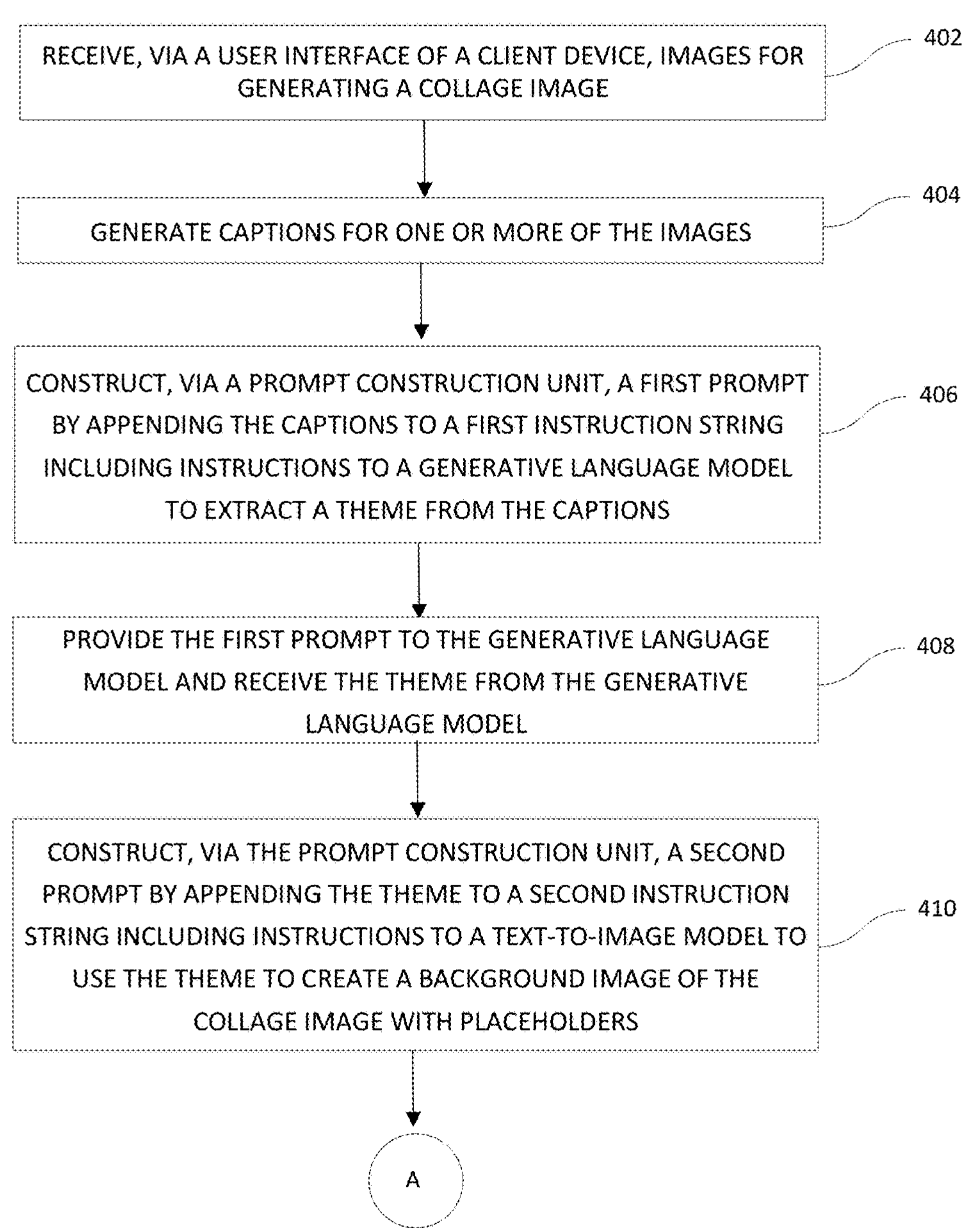
FIGS. 4A-4B depict a flow chart of an example process for AI-based visual content collage generation according to the techniques disclosed herein.
Figure 4B:
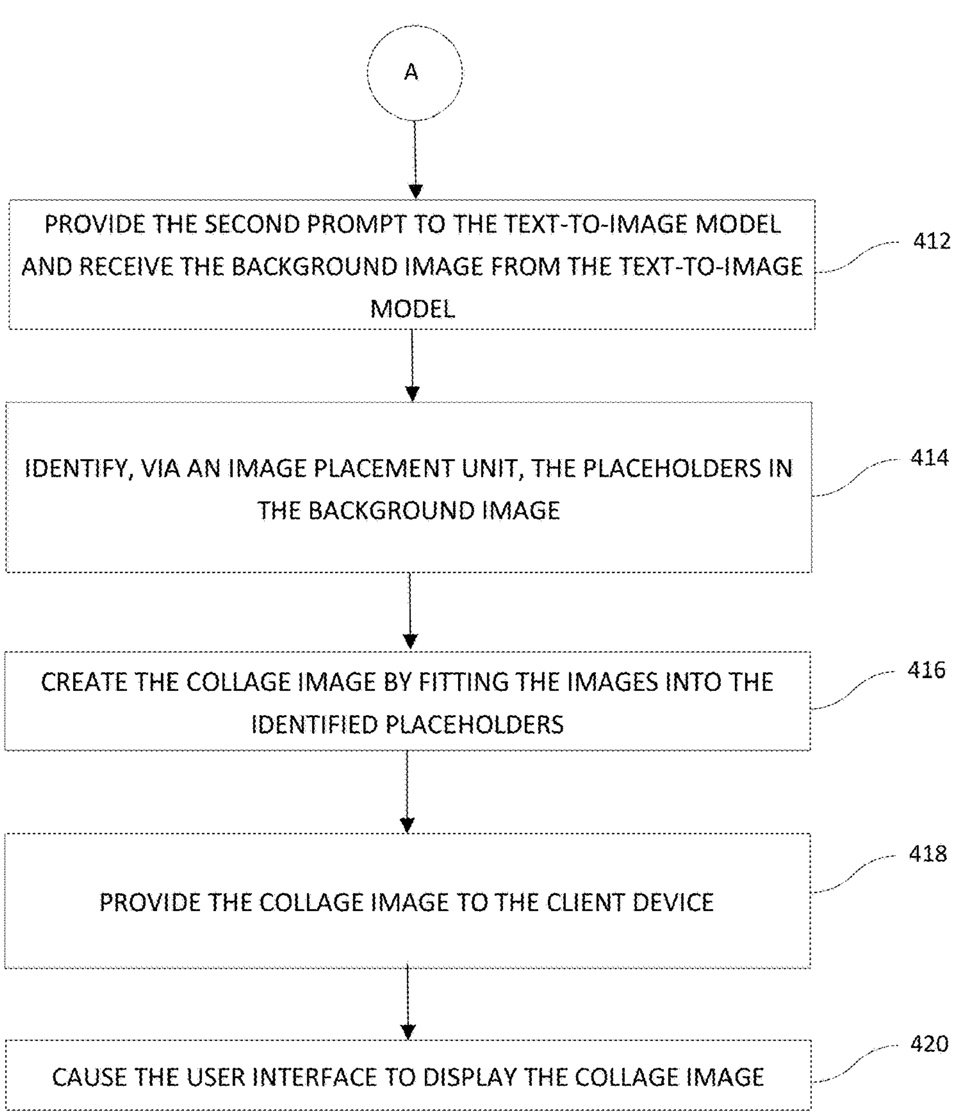
Figure 6:
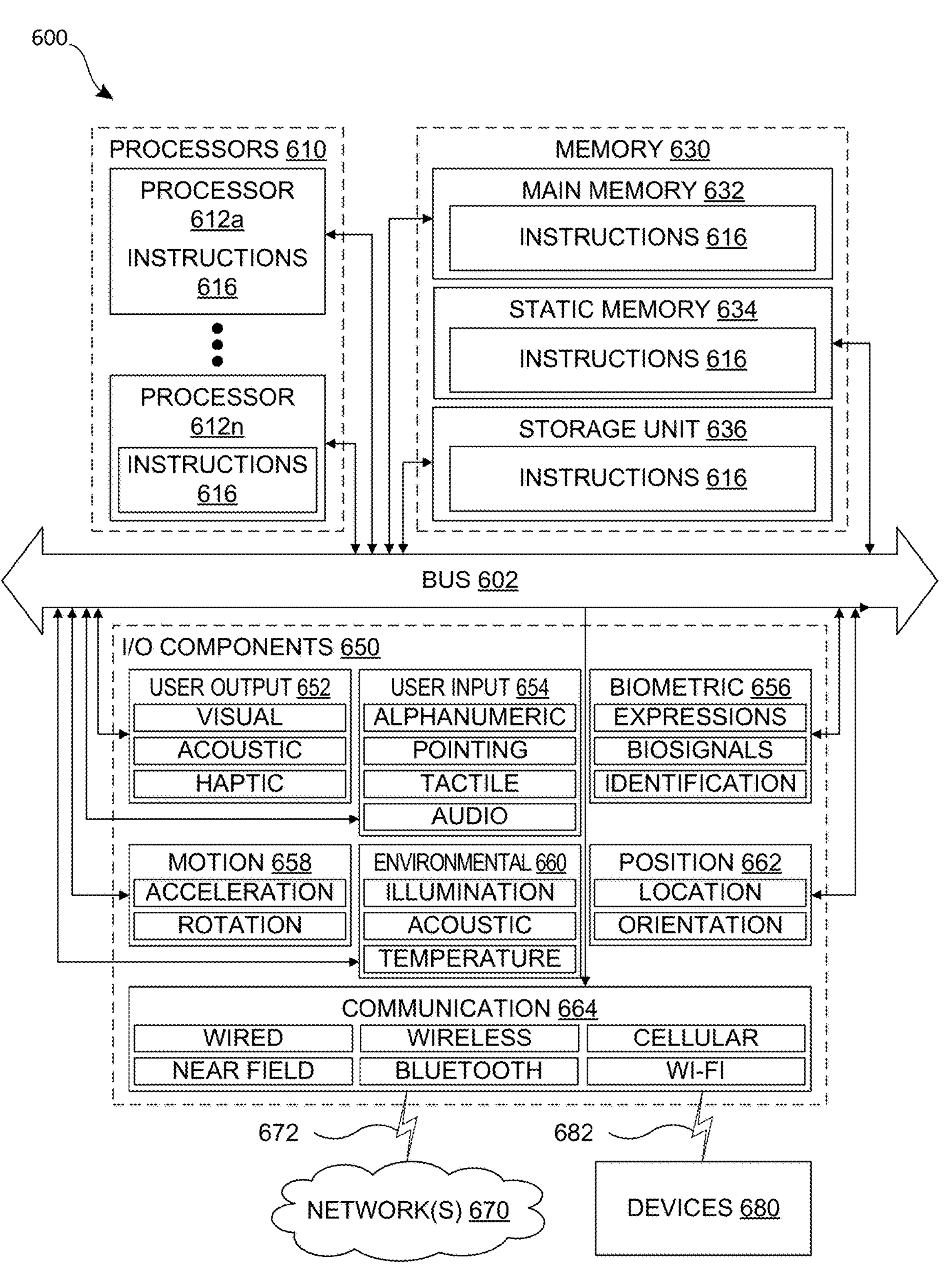
FIG. 6 is a block diagram showing components of an example machine configured to read instructions from a machine-readable medium and perform any of the features described herein.

FIGS. 4A-4B depict a flow chart of an example process 400 for AI-based visual content collage generation according to the techniques disclosed herein. The process 400 can be implemented by the application services platform 110 or its components shown in the preceding examples. The process 400 may be implemented in, for instance, the example processor and memory as shown in FIG. 6. As such, the application services platform 110 can provide means for accomplishing various parts of the process 400, as well as means for accomplishing embodiments of other processes described herein in conjunction with other components of the example computing environment 100. Although the process 400 is illustrated and described as a sequence of steps, it is contemplated that various embodiments of the process 400 may be performed in any order or combination and need not include all the illustrated steps.

In one embodiment, for example, in step 402, the request processing unit 122 receives, via a user interface (e.g., the user interface 205) of a client device (e.g., the client device 105), a plurality of images (e.g., the user-uploaded images 152*a* in FIG. 1B, or the three images on the left side of FIG. 2B) for generating a collage image (e.g., the collage image 142*e* in FIG. 1B, or the collage image on the right side of FIG. 2B).

In step 404, the image captioning component 154 generates captions for one or more of the plurality of images. In step 406, the prompt construction unit 124 constructs a first prompt (e.g., the meta prompt in Table 1), by appending the plurality of images to a first instruction string, the first instruction string comprising instructions to a language generative model (e.g., the LLM 126*a* in FIG. 1B) to extract a theme (e.g., the theme 142*b* in FIG. 1B, such as a wedding in Paris)) from the captions. In step 408, the prompt construction unit 124 provides as an input the first prompt to the generative language model, and receives as an output the theme from the generative language model.

In step 410, the prompt construction unit 124 constructs a second prompt (e.g., the meta prompt in Table 2), by appending the theme to a second instruction string, the second instruction string comprising instructions to a text-to-image model (e.g., the text-to-image model 126*b* in FIG. 1B) to use the theme to create a background image (e.g., the background image 142*c* in FIG. 1B, or the image 162 in FIG. 1C) of the collage image with placeholders (e.g., the placeholders 142*d* in FIG. 1B).

In step 412, the prompt construction unit 124 provides as an input the second prompt to the text-to-image model, and receives as an output the background image from the text-to-image model. In step 414, the image placement component 156 identifies the placeholders in the background image.

In step 416, the image placement component 156 creates the collage image (e.g., the collage image 142*e* in FIG. 1B, or the collage image on the right side of FIG. 2B) by fitting the plurality of images into the identified placeholders.

In some implementations, the generative language model and the text-to-image model are replaced by a multi-modal model.

In some implementations, identifying the placeholders (e.g., the placeholders 142*d* in FIG. 1B) in the background image (e.g., the background image 142*c* in FIG. 1B, or the image 162 in FIG. 1C) is based on at least one of erosion, dilation, blurring, canny edging, convex hulling, or hierarchical contouring. For instance, identifying the placeholders in the background image includes operations of: converting the background image into a LAB color space (e.g., the image 162 in FIG. 1C); binarizing each of a plurality of pixels of the converted background image (e.g., the LAB image in FIG. 1C) into either a black pixel or a white pixel (e.g., in the image 164 in FIG. 1C); identifying one or more artifacts (e.g., the irregularly shaped areas in the image 164 in FIG. 1C) in the binarized background image; removing a sub-set of the artifacts by applying at least one of erosion, dilation, or blurring on the binarized background image (e.g., as the image 166 in FIG. 1C); and after the removing, extracting edges of one or more remaining artifacts in the binarized background image and connecting one or more broken edges among the extracted edges into the placeholders (e.g., as the image 168 in FIG. 1C).

In one embodiment, the instructions to fit the plurality of images into the placeholders include at least one of resizing, rotating, or cropping one or more of the plurality of images to fit into the placeholders.

In another embodiment, a textual query (e.g., the optional user query 152*b* in FIG. 1A, or "red velvet cupcakes and golden ribbons" in FIG. 2D) is received via the user interface (e.g., the user interface 205) beside the plurality of images for generating the collage image. The prompt construction unit (e.g., the prompt construction unit 124) further appends the textual query to the instruction string, and the instruction string further comprises instructions to the generative model to extract the theme (e.g., a cupcake theme in FIG. 2D) further based on the textual query (e.g., "red velvet cupcakes and golden ribbons" in FIG. 2D).

In yet another embodiment, at least one of the plurality of images depicts one or more text elements (e.g., a portrait photo of a person wearing a t-shirt with words of "2023 marine corps marathon", or an image of a tourist standing in front of a "I love New York" sign), and the instruction string further comprises instructions to the generative model (e.g., the generative model(s) 126 in FIG. 1A) to identify the one or more text elements depicted in the at least one image. The prompt construction unit (e.g., the prompt construction unit 124) further appends the one or more text elements to the instruction string, and the instruction string comprises instructions to the generative model to extract the theme (e.g., marathon, or New York) further based on the one or more text elements.

In one embodiment, as a part of the post processing component 158, the pipeline filters out the background image, when a number of the placeholders of the background image is more or fewer than a number of the plurality of images. In another embodiment, as a part of the post processing component 158, the pipeline filters out at least one invalid placeholder among the placeholders, when a size of the at least one invalid placeholder is too small or too big to fit any one of the plurality of images within a predetermined resolution range.

In step 418, the request processing unit 122 provides the collage image to the client device (e.g., the client device 105). For example, the visual content collage output is a photo, a diagram, a chart, an image (e.g., the collage images in FIGS. 2B-2F), an infographic, a video, an animation, a screenshot, a meme, a slide deck, a pictogram, an ideogram, or a software application background. In step 420, the request processing unit 122 causes the user interface (e.g., the user interface 205) of the client device (e.g., the client device 105) to display the collage image (e.g., the collage images in FIGS. 2B-2F).

In another embodiment, the request processing unit 122 stores metadata of the background image (e.g., the background image 142*c* in FIG. 1B) and the placeholders (e.g., the placeholders 142*d* in FIG. 1B) as a collage image template in a design template library (e.g., the design template library 142).

In one embodiment, the request processing unit 122 generates an invitation (e.g., the field 2255*f* with an instruction of "Add user query or edit the collage image" in FIG. 2C) for the user to edit the collage image (e.g., the graduation collage in FIG. 2C), provides the invitation with the collage image to the client device (e.g., the client device 105), and causes the user interface (e.g., the user interface 205) to present the invitation in conjunction with the collage image.

In some implementations, the request processing unit 122 receives at least one user feedback on the visual content collage output (e.g., the collage image in FIG. 2B) via the user interface (e.g., the user interface 205). For example, the user feedback is collected via a user selection of at least one of a thumbs-up tab, a thumbs-down tab, a neutral tab, or a generating-more-image tab, a textual input, or the like. The prompt construction unit 124 can construct a meta prompt by appending the feedback and the visual content collage output to another instruction string comprising instructions to the generative model (e.g., the LLM 126*a*) to generate another textual description combining the feedback (e.g., a thumb-down tab) and the visual content collage output as a new meta prompt, and to input the new meta prompt into the LLM 126*a* to refine the theme. The refined theme is ten sent to the second text-to-image model 126*b* to generate another background image for later processing of a subsequent collage output. The request processing unit 122 then provides the subsequent collage output to the client device (e.g., the client device 105), and causes the user interface (e.g., the user interface 205) to present the subsequent collage output.

The pipeline only requires a user to upload images as prompts thus simplifying the creative process for the users. This case of use increases user productivity and utilization, as well as attracts more non-technical users. By automating the visual content collage generation process, the pipeline eliminates the user having to manually select collage templates, as well as dragging-and-dropping images into the template. This solution significantly lowers the barrier to create high-quality, stylized collage images, and makes the creation process more productive for users. The pipeline can apply the visual content collage generation to a range of visual content types, including images, images with text, videos, or the like, which can be instrumental in tasks like collage template creation, thereby enhancing the versatility of a design platform.

The request processing unit 122 or the prompt construction unit 124 performs content moderation on the collage image output(s) before providing the collage image output(s) to the client device (e.g., the client device 105). After the content moderation, the request processing unit 122 or the prompt construction unit 124 adds meta data of the collage image output(s) as an additional collage image template(s) in a visual content library (e.g., the visual content library 142). The metadata comprises at least one of the captions, the theme, the background image, the placeholders, and the like.

In some implementations, the pipeline can share the visual content collage output(s) immediately, so that the user can celebrate the relevant event (e.g., a wedding anniversary). In other implementations, the pipeline can start a new AI chat to help the user to plan the events by suggesting an action plan with steps. For example, when the user organizes a wedding anniversary, this would often involve setting a budget, creating a guest list, planning the food and drinks, arranging entertainment, reserving and then decorating the venue, and the like. In other implementations, the pipeline can perform the actions of the event on behalf of the user, such as setting the budget for the wedding anniversary, reserving the venue, and the like.

Therefore, the pipeline provides visual content collage generation on a contextual background image, without user inputs more than the uploaded images. The pipeline fetches one or more background images and vary their visual elements based on the theme and user data (e.g., user activities, preferences, or the like) to personalize the collage image(s) for the user. In addition, the pipeline can modify the collage image output(s) by applying other collage style (s) than grid, such as mosaic, shaped, vintage, pop art, surreal, abstract, themed, and the like.

There are security and privacy considerations and strategies for using open source generative models with enterprise data, such as data anonymization, isolating data, providing secure access, securing the model, using a secure environment, encryption, regular auditing, compliance with laws and regulations, data retention policies, performing privacy impact assessment, user education, performing regular updates, providing disaster recovery and backup, providing an incident response plan, third-party reviews, and the like. By following these security and privacy best practices, the example computing environment 100 can minimize the risks associated with using open source generative models while protecting enterprise data from unauthorized access or exposure.

In an example, the application services platform 110 can store enterprise data separately from generative model training data, to reduce the risk of unintentionally leaking sensitive information during model generation. The application services platform 110 can limit access to generative models and the enterprise data. The application services platform 110 can also implement proper access controls, strong authentication, and authorization mechanisms to ensure that only authorized personnel can interact with the selected model and the enterprise data.

The application services platform 110 can also run the generative model(s) 126 in a secure computing environment. Moreover, the application services platform 110 can employ robust network security, firewalls, and intrusion detection systems to protect against external threats. The application services platform 110 can encrypt the enterprise data and any data in transit. The application services platform 110 can also employ encryption standards for data storage and data transmission to safeguard against data breaches.

Moreover, the application services platform 110 can implement strong security measures around the generative model(s) 126 itself, such as regular security audits, code reviews, and ensuring that the model is up-to-date with security patches. The application services platform 110 can periodically audit the generative model's usage and access logs, to detect any unauthorized or anomalous activities. The application services platform 110 can also ensure that any use of open source generative models complies with relevant data protection regulations such as GDPR, HIPAA, or other industry-specific compliance standards.

The application services platform 110 can establish data retention and data deletion policies to ensure that generated data (especially user data) is not stored longer than necessary, to minimizes the risk of data exposure. The application services platform 110 can perform a privacy impact assessment (PIA) to identify and mitigate potential privacy risks associated with the generative model's usage. The application services platform 110 can also provide mechanisms for training and educating users on the proper handling of enterprise data and the responsible use of generative models. In addition, the application services platform 110 can stay up-to-date with evolving security threats and best practices that are essential for ongoing data protection.

The detailed examples of systems, devices, and techniques described in connection with FIGS. 1-4 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 5:
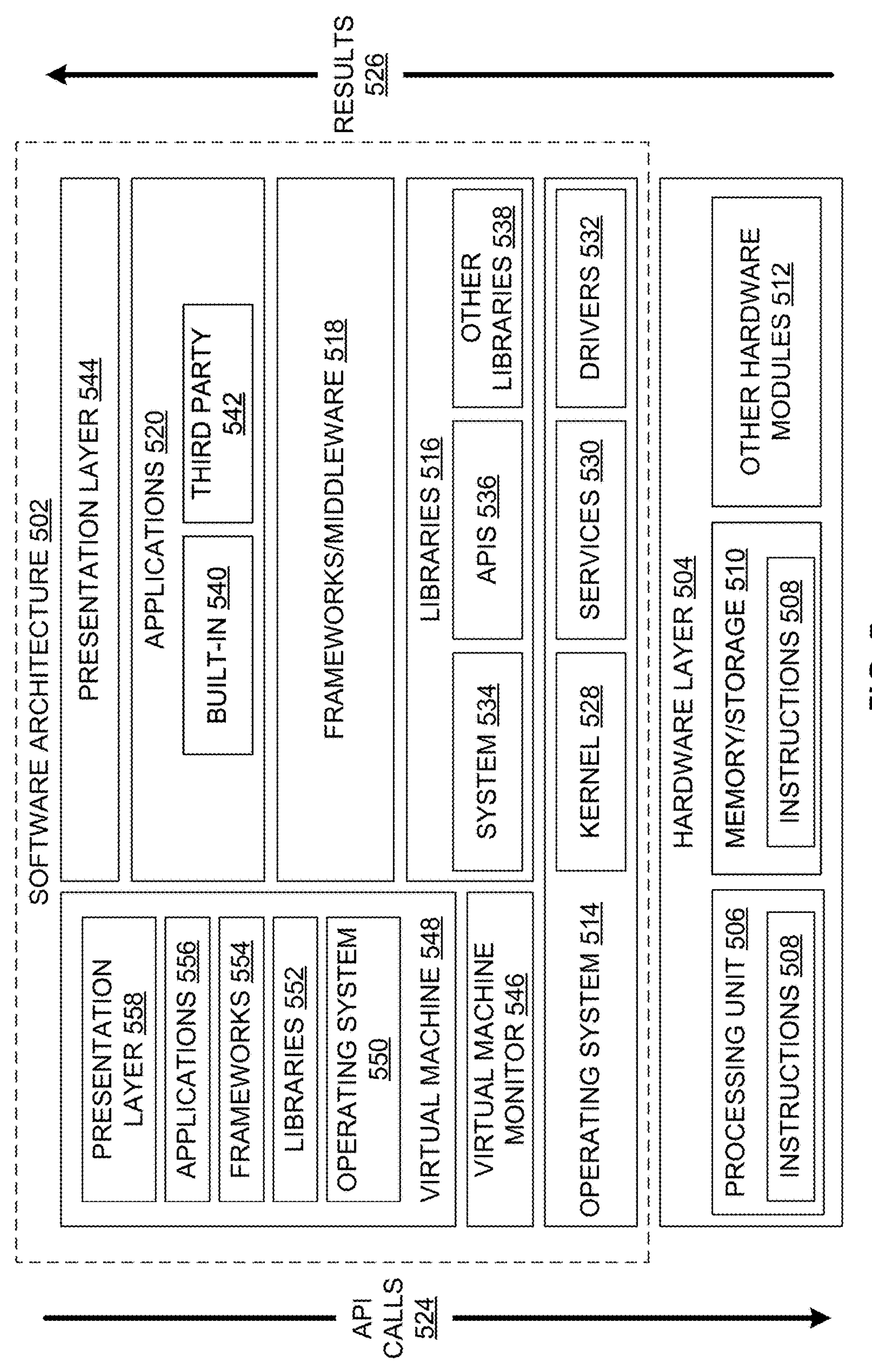
FIG. 5 is a block diagram showing an example software architecture, various portions of which may be used in conjunction with various hardware architectures herein described, which may implement any of the described features.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612*a* to 612*n* that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor, and a machine-readable storage medium storing executable instructions which, when executed by the processor, cause the processor alone or in combination with other processors to perform the following operations:

receiving, via a user interface of a client device, a plurality of images for generating a collage image, wherein the plurality of images are camera-captured images;

generating captions for one or more of the plurality of images;

constructing, via a prompt construction unit, a first prompt by appending the captions to a first instruction string, the first instruction string including instructions to a generative language model to extract a theme from the captions;

providing as an input the first prompt to the generative language model and receiving as an output the theme from the generative language model;

constructing, via the prompt construction unit, a second prompt by appending the theme to a second instruction string, the second instruction string including instructions to a text-to-image model to use the theme to create a background image of the collage image with placeholders;

providing as an input the second prompt to the text-to-image model and receiving as an output the background image from the text-to-image model;

identifying, via an image placement unit, the placeholders in the background image;

creating the collage image by fitting the plurality of images into the identified placeholders;

providing the collage image to the client device; and causing the user interface of the client device to display the collage image.

2. The data processing system of claim 1, wherein to identify the placeholders in the background image, the machine-readable storage medium further includes instructions configured to cause the processor alone or in combination with other processors to perform operations of:

identifying the placeholders in the background image based on at least one of erosion, dilation, blurring, canny edging, convex hulling, or hierarchical contouring, wherein each of the captions includes a natural language phrase, sentence, or paragraph.

3. The data processing system of claim 2, wherein identifying the placeholders in the background image includes operations of:

converting the background image into a LAB color space;

binarizing each of a plurality of pixels of the converted background image into either a black pixel or a white pixel;

identifying one or more artifacts in the binarized background image;

removing a sub-set of the artifacts by applying erosion and at least one of dilation or blurring on white pixels of the binarized background image; and after the removing, extracting edges of one or more remaining artifacts in the binarized background image and connecting one or more broken edges among the extracted edges into the placeholders.

4. The data processing system of claim 1, wherein the machine-readable storage medium further includes instructions configured to cause the processor alone or in combination with other processors to perform operations of:

receiving a textual query via the user interface beside the plurality of images, wherein the prompt construction unit further appends the textual query to the first instruction string, and wherein the first instruction string further comprises instructions to the generative language model to extract the theme further based on the textual query.

5. The data processing system of claim 1, wherein:

at least one of the plurality of images depicts one or more text elements, the first instruction string further comprises instructions to the generative language model to identify the one or more text elements depicted in the at least one image, the prompt construction unit further appends the one or more text elements to the first instruction string, and the first instruction string comprises instructions to the generative language model to extract the theme further based on the one or more text elements.

6. The data processing system of claim 1, wherein fitting the plurality of images into the placeholders include at least one of resizing, rotating, or cropping one or more of the plurality of images to fit into the placeholders.

7. The data processing system of claim 1, wherein the machine-readable storage medium further includes instructions configured to cause the processor alone or in combination with other processors to perform operations of:

filtering out the background image, when a number of the placeholders of the background image is more or fewer than a number of the plurality of images.

8. The data processing system of claim 1, wherein the machine-readable storage medium further includes instructions configured to cause the processor alone or in combination with other processors to perform operations of:

filtering out at least one invalid placeholder among the placeholders, when a size of the at least one invalid placeholder is too small or too big to fit any one of the plurality of images within a predetermined resolution range.

9. The data processing system of claim 1, wherein the machine-readable storage medium further includes instructions configured to cause the processor alone or in combination with other processors to perform operations of:

generating an invitation for the user to edit the collage image;

providing the invitation with the collage image to the client device; and causing the user interface to present the invitation in conjunction with the collage image.

10. The data processing system of claim 1, wherein the machine-readable storage medium further includes instructions configured to cause the processor alone or in combination with other processors to perform operations of:

storing metadata of the background image and the placeholders as a collage image template in a design template library.

11. A method comprising:

receiving, via a user interface of a client device, a plurality of images for generating a collage image, wherein the plurality of images are camera-captured images;

generating captions for one or more of the plurality of images;

constructing, via a prompt construction unit, a first prompt by appending the captions to a first instruction string, the first instruction string including instructions to a generative language model to extract a theme from the captions;

providing as an input the first prompt to the generative language model and receiving as an output the theme from the generative language model;

constructing, via the prompt construction unit, a second prompt by appending the theme to a second instruction string, the second instruction string including instructions to a text-to-image model to use the theme to create a background image of the collage image with placeholders;

providing as an input the second prompt to the text-to-image model and receiving as an output the background image from the text-to-image model;

identifying, via an image placement unit, the placeholders in the background image;

creating the collage image by fitting the plurality of images into the identified placeholders;

providing the collage image to the client device; and causing the user interface of the client device to display the collage image.

12. The method of claim 11, to identify the placeholders in the background image, the method further comprising:

identifying the placeholders in the background image based on at least one of erosion, dilation, blurring, canny edging, convex hulling, or hierarchical contouring.

13. The method of claim 12, wherein identifying the placeholders in the background image includes operations of:

converting the background image into a LAB color space;

binarizing each of a plurality of pixels of the converted background image into either a black pixel or a white pixel;

identifying one or more artifacts in the binarized background image;

removing a sub-set of the artifacts by applying at least one of erosion, dilation, or blurring on the binarized background image; and after the removing, extracting edges of one or more remaining artifacts in the binarized background image and connecting one or more broken edges among the extracted edges into the placeholders.

14. The method of claim 11, further comprising:

receiving a textual query via the user interface beside the plurality of images, wherein the prompt construction unit further appends the textual query to the first instruction string, and wherein the first instruction string further comprises instructions to the generative language model to extract the theme further based on the textual query.

15. The method of claim 11, wherein fitting the plurality of images into the placeholders include at least one of resizing, rotating, or cropping one or more of the plurality of images to fit into the placeholders.

16. A non-transitory computer readable medium on which are stored instructions that, when executed, cause a programmable device to perform functions of:

receiving, via a user interface of a client device, a plurality of images for generating a collage image, wherein the plurality of images are camera-captured images;

generating captions for one or more of the plurality of images;

constructing, via a prompt construction unit, a first prompt by appending the captions to a first instruction string, the first instruction string including instructions to a generative language model to extract a theme from the captions;

providing as an input the first prompt to the generative language model and receiving as an output the theme from the generative language model;

constructing, via the prompt construction unit, a second prompt by appending the theme to a second instruction string, the second instruction string including instructions to a text-to-image model to use the theme to create a background image of the collage image with placeholders;

providing as an input the second prompt to the text-to-image model and receiving as an output the background image from the text-to-image model;

identifying, via an image placement unit, the placeholders in the background image;

creating the collage image by fitting the plurality of images into the identified placeholders;

providing the collage image to the client device; and causing the user interface of the client device to display the collage image.

17. The non-transitory computer readable medium of claim 16, wherein the instructions when executed to identify the placeholders in the background image, further cause the programmable device to perform functions of:

identifying the placeholders in the background image based on at least one of erosion, dilation, blurring, canny edging, convex hulling, or hierarchical contouring.

18. The non-transitory computer readable medium of claim 17, wherein identifying the placeholders in the background image includes operations of:

converting the background image into a LAB color space;

binarizing each of a plurality of pixels of the converted background image into either a black pixel or a white pixel;

identifying one or more artifacts in the binarized background image;

removing a sub-set of the artifacts by applying at least one of erosion, dilation, or blurring on the binarized background image; and after the removing, extracting edges of one or more remaining artifacts in the binarized background image and connecting one or more broken edges among the extracted edges into the placeholders.

19. The non-transitory computer readable medium of claim 16, wherein the instructions when executed, further cause the programmable device to perform functions of:

receiving a textual query via the user interface beside the plurality of images, wherein the prompt construction unit further appends the textual query to the first instruction string, and wherein the first instruction string further comprises instructions to the generative language model to extract the theme further based on the textual query.

20. The non-transitory computer readable medium of claim 16, wherein fitting the plurality of images into the placeholders include at least one of resizing, rotating, or cropping one or more of the plurality of images to fit into the placeholders.

* * * * *